(12) United States Patent
Sugimoto

(10) Patent No.: US 8,699,084 B2
(45) Date of Patent: Apr. 15, 2014

(54) IMAGE FORMING APPARATUS, AND METHOD FOR PRODUCING PRINTED MATTER

(75) Inventor: Kunihiko Sugimoto, Yawata (JP)

(73) Assignee: Konica Minolta Business Technologies, Inc,., Chiyoda-Ku, Tokyo (JP)

( * ) Notice: Subject to any disclaimer, the term of this patent is extended or adjusted under 35 U.S.C. 154(b) by 637 days.

(21) Appl. No.: 13/034,299

(22) Filed: Feb. 24, 2011

(65) Prior Publication Data

US 2011/0216373 A1 Sep. 8, 2011

(30) Foreign Application Priority Data

Mar. 3, 2010 (JP) ................................. 2010-046212

(51) Int. Cl.
*G06T 5/00* (2006.01)
*H04N 1/407* (2006.01)

(52) U.S. Cl.
USPC ............ 358/3.26; 358/1.9; 358/2.1; 358/496; 358/448; 358/497; 382/282

(58) Field of Classification Search
None
See application file for complete search history.

(56) References Cited

U.S. PATENT DOCUMENTS 5,731,882 A * 3/1998 Kawamura ............... 358/426.09
6,298,359 B1 * 10/2001 Konishi et al. ................. 715/201

FOREIGN PATENT DOCUMENTS

| JP | 2002-067424 A | 3/2002 |
| JP | 2003-233480 A | 8/2003 |
| JP | 2007-050572 A | 3/2007 |
| JP | 4198025 B2 | 12/2008 |

OTHER PUBLICATIONS

Office Action (Notification of Reason(s) for Refusal) dated Nov. 1, 2011, issued in the corresponding Japanese Patent Application No. 2010-046212, and an English Translation thereof. (6 pages).

* cited by examiner

*Primary Examiner* — Quang N Vo
(74) *Attorney, Agent, or Firm* — Buchanan Ingersoll & Rooney PC

(57) ABSTRACT

An image forming apparatus for printing an original image indicated based on image data is provided. The image forming apparatus includes a paper feed portion that conveys, to a print position, paper having a size in a feed direction larger than a size of the original image, a region selection portion that selects, as an additional image, a band-shaped region that has a predetermined width and extends inwardly from an edge of the original image in a direction corresponding to the feed direction of the paper, and an image correction portion that adds the additional image repeatedly in such a manner that the additional image is placed adjacent to each other outwardly from the edge of the original image. A corrected image obtained by adding the additional image with the image correction portion is printed onto the paper.

15 Claims, 17 Drawing Sheets

CENTER LINE

CENTER LINE

IMAGE FORMING APPARATUS, AND METHOD FOR PRODUCING PRINTED MATTER

This application is based on Japanese patent application No. 2010-046212 filed on Mar. 3, 2010, the contents of which are hereby incorporated by reference.

BACKGROUND OF THE INVENTION

1. Field of the Invention

The present invention relates to an image forming apparatus for printing an image onto paper, and a method for producing a printed matter.

2. Description of the Related Art

For producing a printed matter to be published or distributed, methods such as Desktop Publishing (DTP) and Print On Demand (POD) are employed. According to the methods, a predetermined image forming apparatus is used to perform printing directly based on digital image data created by using a computer instead of going through a plate-making process. As the predetermined image forming apparatus, a dedicated on-demand printer and general-purpose Office Automation (OA) equipment such as a printer or a multifunction device are used. The use of recent image forming apparatuses makes it possible to produce a printed matter having a quality comparable to that of a printed matter obtained through offset printing.

A printed matter produced with such an image forming apparatus is not limited to one having a margin (non-printed region) along the periphery of the paper surface. A printed matter is also produced whose print range to which a colored material is applied extends to the edges of the paper surface. An example of the printed matter is one that contains, as image information, an edging pattern, a background image (solid color background included), or an index for facilitating the selection of a page of a bound printed matter, for example. In general, in order to produce a printed matter of this type, an original image is first enlarged slightly on a computer by an amount of a margin to be cut. Then, the paper is cut after printing, so that an unnecessary margin part is trimmed.

The following related techniques have been proposed with respect to production of a printed matter on the assumption that the paper is cut after printing. According to one of the techniques, when images on a plurality of pages are printed onto roll paper, margins are provided between the pages (see Japanese Laid-open Patent Publication No. 2003-233480). The technique reduces the possibility that, even if a cut position is shifted within an error tolerance range, an image on the next page does not extend to an image on the current page. According to the other technique, when a plurality of images having a relatively small size such as a postcard are printed onto paper having a size larger than that of the images with the images arranged in rows and columns, amounts of the individual images extending beyond perforations which are provided on paper in advance for separation thereof are adjusted depending on the paper size (see Japanese Laid-open Patent Publication No. 2002-067424). The technique minimizes margins that are provided for reducing a direction shift of paper (skewed paper) occurring in the case of feeding paper, so that the paper surface can be used effectively.

There is a request that an image IM containing an index tag image IX of FIG. 4A is to be printed onto paper P as shown in FIG. 4B. In a state where a plurality of pieces of paper are stacked and bound, the index tag images IX are seen at the fore edge as shown in FIG. 4C, which helps a person in opening a desired page. However, ordinary image forming apparatuses are structured not to form an image in the edges of paper in order to prevent a color material, which causes a paper jam or spots, from scattering. Stated differently, paper at the time of the completion of printing has, in the edges thereof, image unformed regions where no images are formed. Since such an image unformed region is provided, a part of the index tag image IX on the paper edge side is not printed (see FIG. 5A), and, as a result, no index tag images IX are seen at the fore edge in a state where a plurality of pieces of paper are bound up (see FIG. 5B).

In order to use an image forming apparatus configured to provide image unformed regions in the edges of paper to obtain a printed matter in which an index tag image IX is seen at the fore edge, it is preferable that an image IM be printed onto paper whose region excluding the image unformed regions is larger than the image IM, and then, the paper is trimmed to remove an unnecessary part therefrom. Note, however, that a cut margin is to be secured depending on an alignment error between a cut position and a print region. A cut margin is obtained by enlarging the image IM slightly and printing the enlarged image IM in a manner similar to conventional manners. However, enlarging the image IM is not allowed in some cases. Such cases are, for example, a case in which the image IM contains a full-scale photograph as information, and a case in which the image IM contains a digital watermark in which the positional relationship of pixels is important.

SUMMARY

The present disclosure is directed to solve the problems pointed out above, and therefore, an object of an embodiment of the present invention is to provide an image forming apparatus useful for producing a printed matter whose print area on the paper surface extends to an edge of the paper, and a method for producing the printed matter.

According to an aspect of the present invention, an image forming apparatus for printing an original image indicated based on image data includes a paper feed portion that conveys, to a print position, paper having a size in a feed direction larger than a size of the original image, a region selection portion that selects, as an additional image, a band-shaped region that has a predetermined width and extends inwardly from an edge of the original image in a direction corresponding to the feed direction of the paper, and an image correction portion that adds the additional image repeatedly in such a manner that the additional image is placed adjacent to each other outwardly from the edge of the original image, wherein a corrected image obtained by adding the additional image with the image correction portion is printed onto the paper.

These and other characteristics and objects of the present invention will become more apparent by the following descriptions of preferred embodiments with reference to drawings.

DESCRIPTION OF THE PREFERRED EMBODIMENTS

Three embodiments are described in order below with reference to the accompanying drawings. A description of points common to the three embodiments shall be omitted to avoid the redundancy. Among constituent elements shown in the individual drawings, constituent elements that are identical to each other or correspond to each other are identified with the identical or corresponding reference signs. For the sake of simplicity, in drawings showing the relationship between paper and an image, the left-hand side and the right-hand side of the drawings are respectively referred to as the "leading edge" and the "trailing edge" of the paper in the paper feed direction unless particularly stated otherwise.

Figure 1:
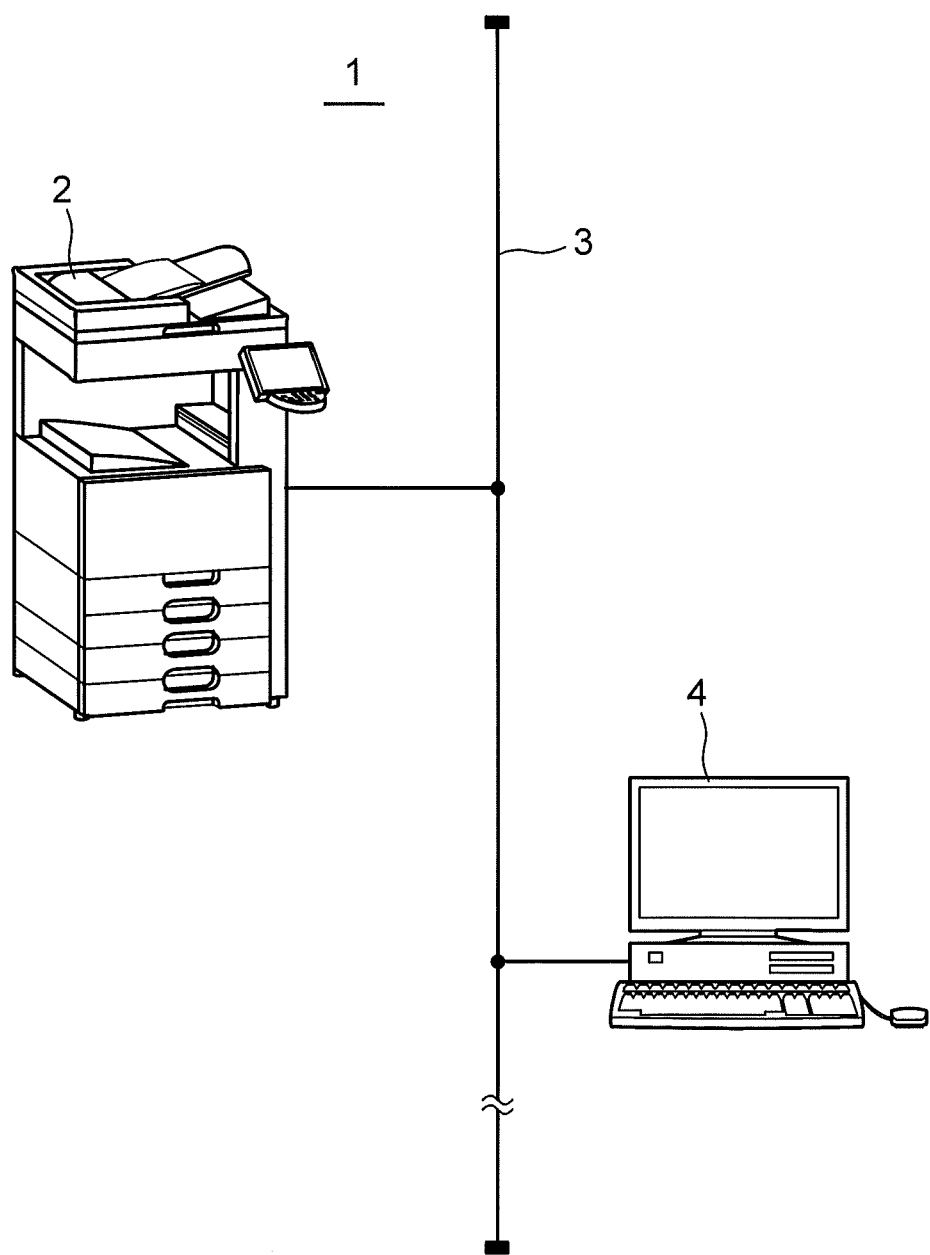
FIG. 1 is a diagram illustrating an example of the overall configuration of an image forming system using an MFP.

An image forming system 1 exemplified in FIG. 1 is configured of a Multi Function Peripheral (MFP) 2 acting as an image forming apparatus for printing an image onto paper, and a terminal 4 for giving a print job to the MFP2. The MFP 2 is a multifunction device, for example. The multifunction device is an information device having a plurality of functions. The multifunction device has basic functions such as copying and network printing, and a variety of functions such as image input, facsimile communication, e-mail transmission/reception, and document saving.

The terminal 4 is an information processing device represented by a personal computer. The terminal 4 is provided with, for example, a hard disk drive (not shown) as a storage for storing, therein, a document such as text or an image in the form of electronic data. The MFP 2 and the terminal 4 are connected to each other via a network 3 including a wired or wireless communication path.

Figure 2:
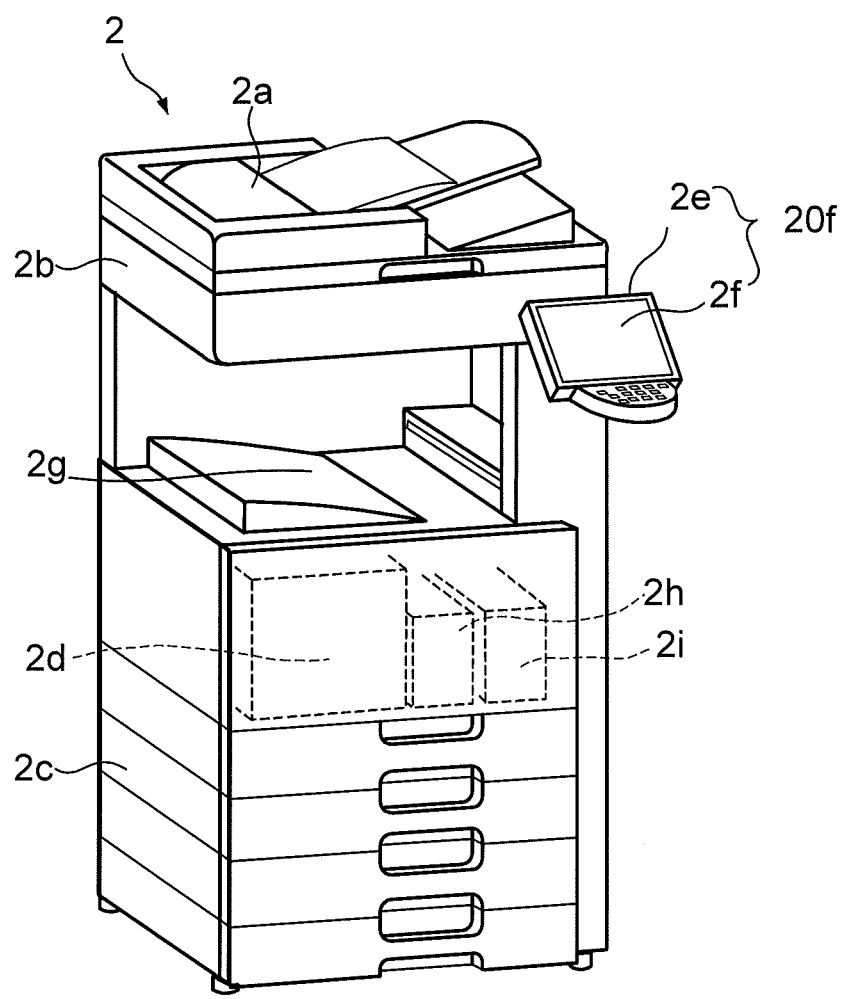
FIG. 2 is an external view illustrating an example of an MFP.

FIG. 2 is an external view showing an example of the MFP 2. As shown in FIG. 2, the MFP 2 is provided with a document feeder 2a, a scanner unit 2b, a paper supplying/conveying portion 2c, a printer unit 2d, a fixing unit 2h, a trimming device 2i, a paper output tray 2g, and so on. The MFP 2 is also provided with an operational panel 20f configured of a display portion 2e and an operational portion 2f as a user interface for operation. The display portion 2e is configured of, for example, a liquid crystal display, and the operational portion 2f is configured of, for example, a touchscreen overlaid on the front face of a display of the display portion 2e.

A user can use the terminal 4 to transmit, as a print job, a document such as text or an image in the form of electronic data to the MFP 2, and causes the MFP 2 to print out the document. The user also can operate the MFP 2 directly to cause the same to perform a desired copy job or the like. Operation for normal printing and copying that is performed by using the MFP 2 and the terminal 4 is the same as that by using an ordinary image forming apparatus and an ordinary terminal; therefore, the description thereof is omitted.

Figure 3A:
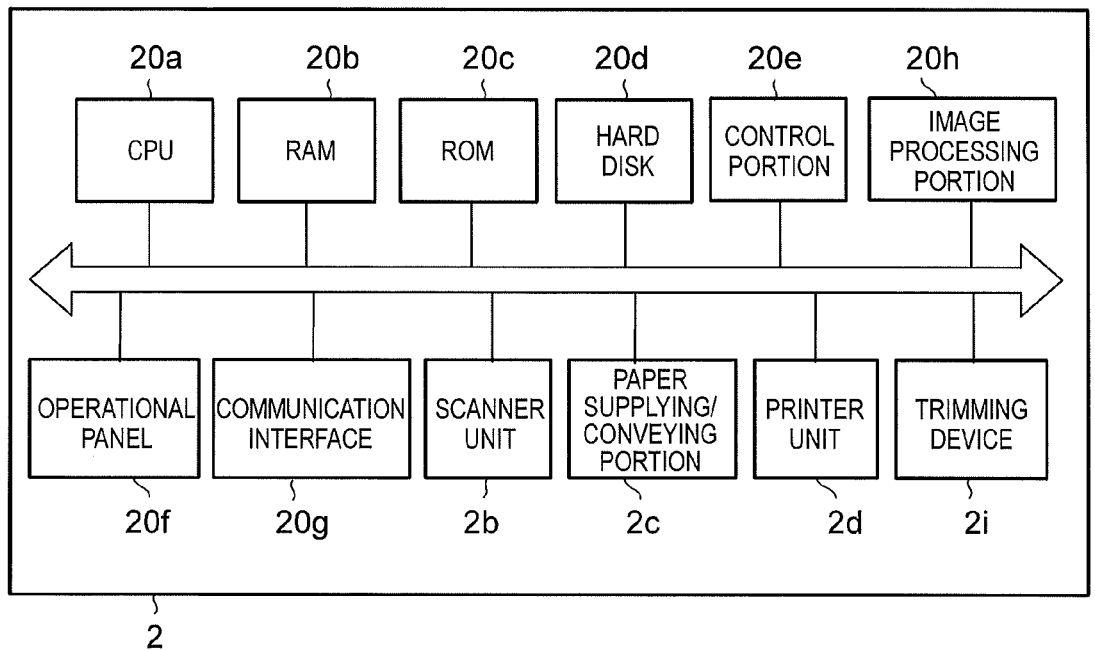
FIGS. 3A and 3B are diagrams illustrating an example of the hardware configuration of an MFP.
Figure 3B:
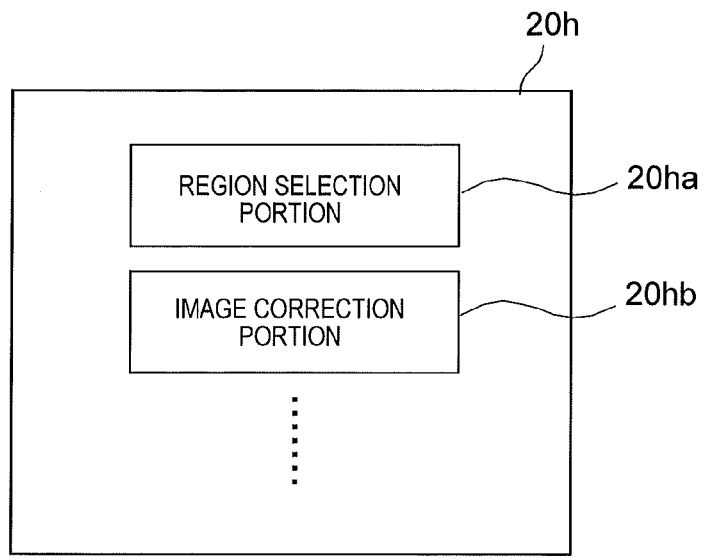

The following is a description of the hardware configuration of the MFP 2. FIGS. 3A and 3B are diagrams showing an example of the hardware configuration of the MFP 2.

As shown in FIG. 3A, the MFP 2 is configured of a Central Processing Unit (CPU) 20a, a Random Access Memory (RAM) 20b, a Read Only Memory (ROM) 20c, a hard disk 20d, a control portion 20e, the operational panel 20f, a communication interface 20g, an image processing portion 20h, the scanner unit 2b, the paper supplying/conveying portion 2c, the printer unit 2d, the trimming device 2i, and so on. As shown in FIG. 3B, the image processing portion 20h is configured of a region selection portion 20ha, an image correction portion 20hb, and so on.

The control portion 20e is a circuit for controlling devices such as the hard disk 20d, the operational panel 20f, the communication interface 20g, the image processing portion 20h, the scanner unit 2b, the paper supplying/conveying portion 2c, the printer unit 2d, and the trimming device 2i. The communication interface 20g is connected to the network 3. Although not shown in the drawings, the paper supplying/conveying portion 2c includes a paper feed mechanism extending from the paper supplying/conveying portion 2c to the paper output tray 2g shown in FIG. 2 and a part of the control portion 20e for controlling the synchronization of paper to be conveyed on the feed path.

The following is a description of an index tag used for chapter division at the time of binding printed matters or copied matters, or for classification of printed matters or copied matters accumulated in the paper output tray 2g.

[First Embodiment]

Figure 4A:
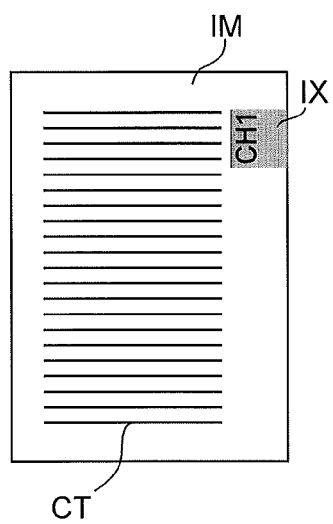
FIGS. 4A-4C are diagrams illustrating an example of printing an index tag image.
Figure 4B:
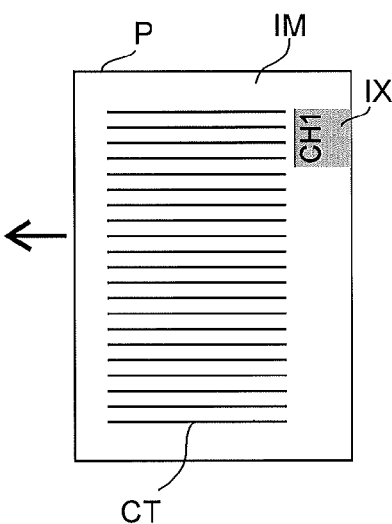
Figure 4C:
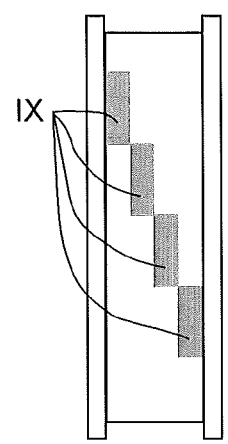

FIGS. 4A-4C are diagrams illustrating an ideal example of printing an index tag image. FIG. 4A shows an example of an original image IM including text CT and an index tag image IX. FIG. 4B shows a state where the original image IM is printed onto paper P having the same size as that of the original image IM. FIG. 4C shows the fore edge that is opposite to the spine of a book for a case where a plurality of sheets of paper having the original image IM printed are bound up. FIGS. 4A-4C show the state of paper P having no image unformed regions obtained with so-called full bleed printing (borderless printing). In each of the illustrated examples of FIGS. 4A and 4B, the index tag image IX is provided at a predetermined position. As shown in FIG. 4C, the positions of the index tag image IX differ for each chapter in the vertical direction of FIG. 4B. The arrow of FIG. 4B represents the feed direction of the paper P by the MFP 2.

As described above, if the original image IM can be printed onto the paper P with borderless printing, the index tag images IX can be viewed on the fore edge of a book as shown in FIG. 4C, and also, the index tag images IX of printed matters or copied matters accumulated on the paper output tray 2g can be viewed easily. The first embodiment is directed to a so-called left binding in which, at the time of binding single-sided printed matters, the index tag images IX are provided at the trailing edge of the paper in the paper feed direction, i.e., the right-hand side of the drawing.

Figure 5A:
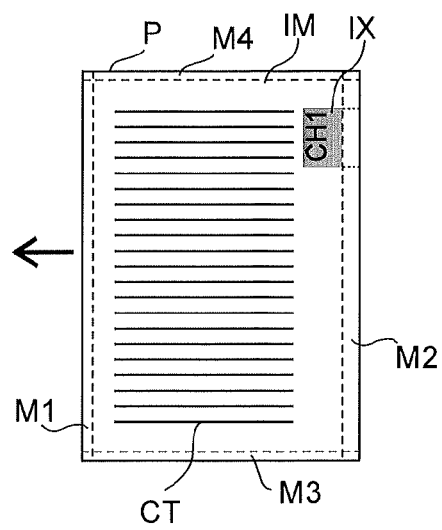
FIGS. 5A and 5B are diagrams illustrating an example in which an index tag image is lacking in an image unformed region.
Figure 5B:
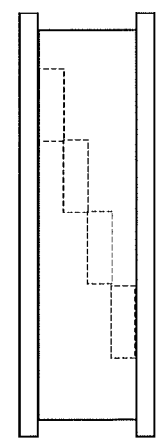

In ordinary image forming apparatuses, however, it is difficult to eliminate image unformed regions. FIGS. 5A and 5B are diagrams illustrating an example in which index tag images IX are partially lost due to the presence of an image unformed region. FIG. 5A shows image unformed regions M1-M4, and FIG. 5B shows an influence of the image unformed region M2 inflicted on the view of the index tag images IX.

As shown in FIG. 5A, in ordinary image forming apparatuses, the image unformed regions M1-M4 are generated along the individual edges of the paper P. In particular, the image unformed regions M1 and M2 respectively at the leading edge and the trailing edge of the paper in the paper feed direction are apparent. Out of the two regions, the image unformed region M2 at the trailing edge of the paper is more apparent than the other. Such image unformed regions are generated because of the basic structure of an image forming apparatus. To be specific, paper onto which an image has been formed is fixed by the fixing unit 2h and then is removed therefrom. The image unformed region M1 is provided primarily to facilitate the removal of the paper. As for the image unformed region M2, in the case of transferring, onto paper, toner on an intermediate belt (not shown) or a photoconductor drum (not shown) by means of which an image is to be formed, if an image, i.e., toner, is present at the trailing edge of the paper, the trailing edge of the paper is less easily removed from the intermediate belt or the photoconductor drum, which causes a problem in paper feed. Alternatively, the trailing edge of the paper may warp at the time of being removed from the intermediate belt or the photoconductor drum. This causes problems, e.g., image distortion or toner stains. As countermeasures therefor, the image unformed region M2 is provided at the trailing edge of the paper in many cases.

According to an image forming apparatus that involves generating an apparent image unformed region at the trailing edge of paper in the paper feed direction, in the case where the original image IM containing the index tag image IX as shown in FIG. 4A is printed onto paper P, a printed matter is outputted in such a manner that an image overlapping the image unformed region M2 is lost as shown in FIG. 5A. To be more specific, a printed matter is outputted in such a manner that an image of the index tag image IX corresponding to the right end in FIG. 5A, i.e., an image on the trailing end of the paper P in the paper feed direction is lost. As a result, the index tag images TX become invisible from the side of the fore edge of a book as shown in FIG. 5B.

Figure 6A:
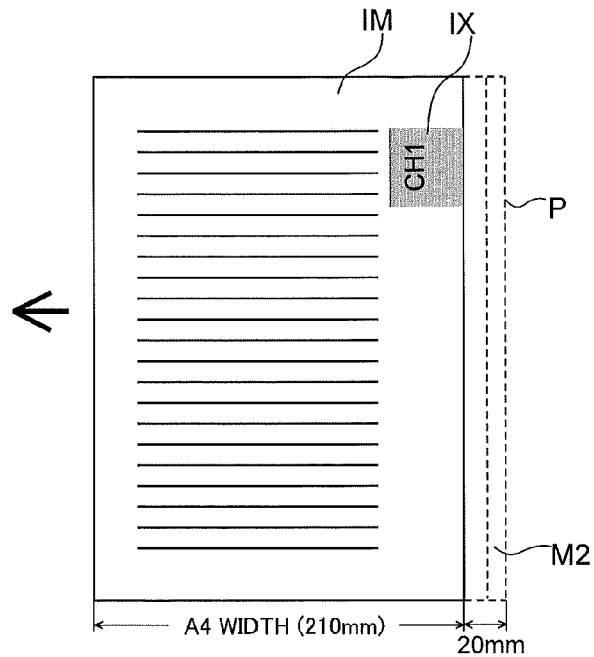
FIGS. 6A and 6B are diagrams illustrating the positional relationship between a cut position of paper and an index tag image.
Figure 6B:
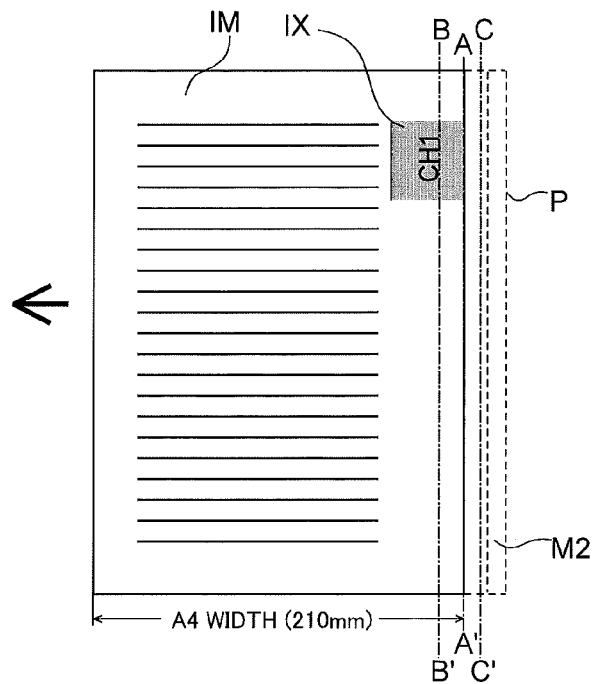

FIGS. 6A and 6B are diagrams illustrating a method for preventing the index tag image IX from being partially lost due to the image unformed region M2. FIG. 6A shows the positional relationship between paper P to be used and the index tag image IX, and FIG. 6B shows an influence of an error occurring at the time of cutting the paper P.

Referring to FIG. 6A, in the case where, for example, the original image IM is an A4 size (210×297 mm) image, paper P having a length in the paper feed direction greater than that of the original image IM, e.g., having a size of 230×297 mm, is used to print the original image IM. In such a case, control is so performed that the paper P and the original image IM establish a predetermined positional relationship in the paper feed direction. In the illustrated example of FIG. 6A, as viewed from the paper feed direction, the image is printed out with the leading edge of the paper P aligned with the leading edge of the original image IM.

This prevents the index tag image IX from extending over the image unformed region M2 as shown in FIG. 6B, and the entire index tag image IX is formed on the paper P. The paper P onto which the index tag image IX has been formed as mentioned is then conveyed to the trimming device 2i. The trimming device 2i cuts the trailing end of the paper P at a cut position of the paper P denoted by the A-A' line so that the paper P has a predetermined length, e.g., 210 mm, from the leading edge thereof to the cut position in the paper feed direction.

In some cases, however, the paper P is not cut properly at the cut position along the A-A' line because an error occurs in the stop position of the paper P at the trimming device 2i, or, alternatively, before reaching the trimming device 2i, the paper P expands or shrinks due to the heat or pressure applied thereto by the fixing unit 2h through which the paper P has passed. If the paper P is cut at the position along the line B-B', then the background (pattern) of the index tag image IX, which is displayed in gray in the drawing, and a description of the index tag image IX written on the pattern, which corresponds to "CH1" of the drawing, are sometimes partially lost. If the paper P is cut at the position along the maximum trimming error position C-C' line by the trimming device 2i, then a blank section is generated on the right end of the index tag image IX in FIG. 6B, which results in the state as shown in FIG. 5B.

Figure 7A:
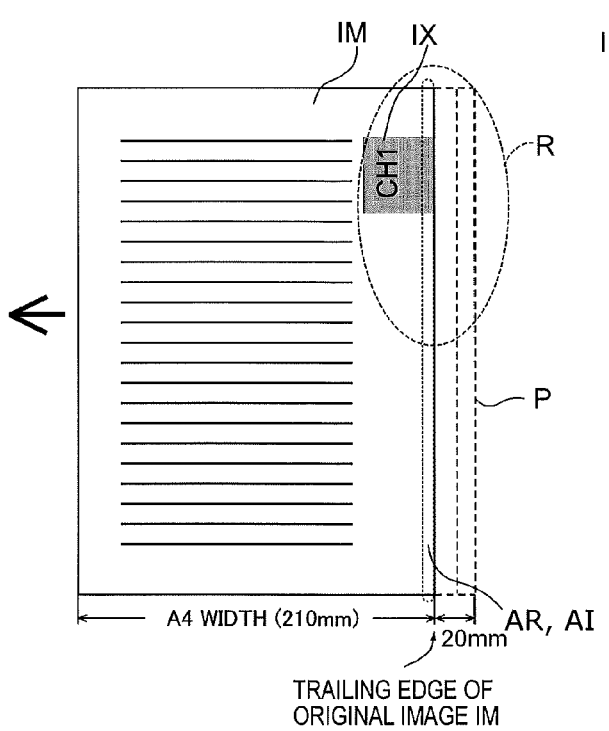
FIGS. 7A-7C are diagrams illustrating a process on an index tag image in the first embodiment.
Figure 7B:
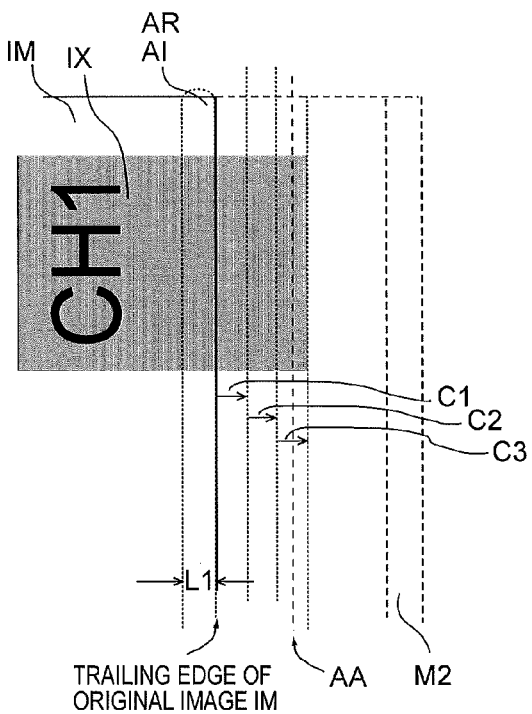
Figure 7C:
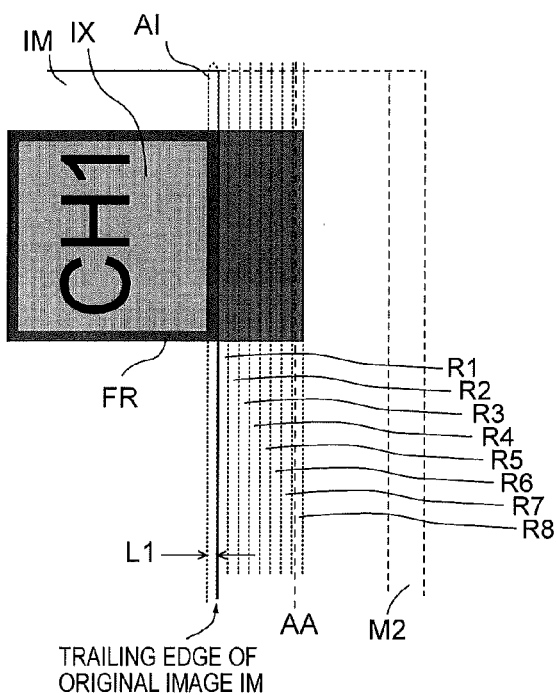
Figure 8:
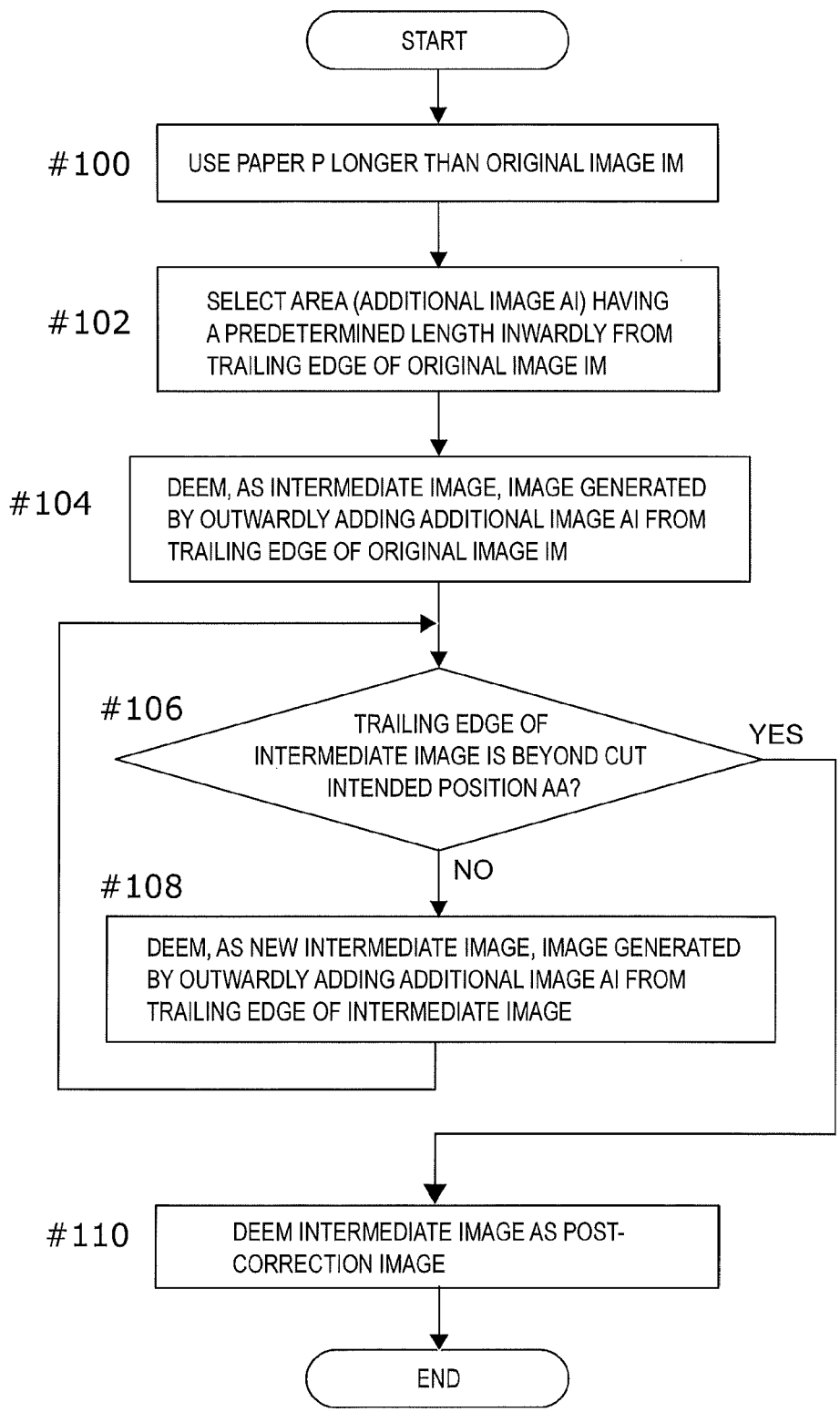
FIG. 8 is a flowchart depicting an example of a process on an index tag image in the first embodiment.

In order to avoid these states, image processing according to the first embodiment is described with reference to FIGS. 7A-8. FIGS. 7A-7C show image processing according to the first embodiment. FIG. 7A is a drawing showing the state where the original image IM having a horizontal length of 210 mm is overlaid on paper P having a larger horizontal length than that of the original image IM, i.e., having a horizontal length of 230 mm. FIG. 7A shows the state where a predetermined band-shaped region, i.e., an additional image region AR, is selected from the trailing edge of the original image IM inwardly. FIG. 7B is an enlarged view of a region R shown in FIG. 7A, and shows the state where the additional image AI of the additional image region AR is added. FIG. 7C is an enlarged view of the region R shown in FIG. 7A, and depicts a processing example on the index tag image IX having a fringe. FIG. 8 is a flowchart depicting the steps of image processing described with reference to FIG. 7C.

First, as shown in FIG. 7A, paper P is used which has a length in the paper feed direction greater than that of the original image IM (#100 of FIG. 8). The paper P of this size is selected automatically or manually as described later. The paper P of this size thus selected is supplied and conveyed by the paper supplying/conveying portion 2c. In the case where the original image IM is an A4 size (210×297 mm) image, paper P having a size of, for example, 230×297 mm is used. Note that, in the first embodiment, the size of each of the original image IM and the paper P in the paper feed direction is sometimes referred to as a "length", and the size of each thereof in the direction perpendicular to the paper feed direction is sometimes referred to as a "width".

Then, as shown in FIG. 7B, the region selection portion 20ha selects and copies an additional image AI which has a predetermined length L1 corresponding to the entire width of the original image IM and extends from the trailing edge of the original image IM toward the leading edge thereof, i.e., inwardly, and extends along the trailing edge of the original image IM (#102 of FIG. 8). Although a default value is set as the predetermined length L1 as mentioned below, it is possible to change manually the predetermined length L1. In short, it is possible to arrange the predetermined length L1 in such a manner that the predetermined length L1 is variable based on the size, shape, design, pattern type, description, and the like of the index tag image IX. The additional image AI is temporarily stored in a storage medium such as, for example, the RAM 20b or the hard disk 20d.

As shown in the arrows C1-C3 of FIG. 7B, the additional image AI thus stored is repeatedly added to the original image IM in order from the trailing edge thereof outwardly in such a manner that the additional images AI are adjacent to each other. The following options are provided as to how many times the additional image AI is to be added repeatedly and what kind of method is to be used for the addition.

Option 1) The number of repetitions is fixed in advance. This saves a user from a burdensome task of making settings for each of the different original images IM. Option 2) The number of repetitions is preset depending on the length L1 of the additional image AI. To be specific, the number of repetitions is set at a large value for the case where the length L1 is small, and is set at a small value for the case where the length L1 is great. This makes it possible to ensure that the paper is cut on the added additional image AI. Option 3) The additional image AI is repeatedly added until the additional image AI is provided beyond a cut intended position AA. Option 4) In the case of Option 3), the cut intended position AA is set to correspond to the maximum cut error position C-C' line described earlier with reference to FIG. 6B. This makes it possible to surely prevent a blank section from being generated on the right end of the index tag image IX. Option 5) In the case of Option 3), the cut intended position AA is set to overlay the image unformed region M2 on the paper P. This makes it possible to more surely prevent a blank section from being generated on the right end of the index tag image IX.

The examples of Option 3)-Option 5) are described next with reference to FIGS. 7C and 8. Suppose that, for example, the pattern part of the index tag image IX has a fringe FR having a density (or a color) different from that of the background of the index tag image IX, as shown in FIG. 7C. In such a case, if the length L1 of the additional image AI is large excessively, the light and dark pattern constituted by the background pattern and the fringe FR of the index tag image IX is copied at the trailing edge of the original image IM. Thereafter, when the paper P onto which an image obtained by correcting the original image IM has been printed is cut, it is not defined which pattern is positioned at the trailing edge of the cut index tag image IX, the light background pattern or the fringe FR pattern having the dark (different) color.

In such a case, the length L1 of the additional image A1 is set to be a small value, i.e., set in units of pixels, as described later. The length L1 is set to be, for example, a length corresponding to 1 pixel. If so, the last pixel positioned at the trailing edge of the index tag image IX, i.e., the additional image AI having the same density (color) as that of the fringe FR, is copied certainly. Accordingly, in the case where the paper P is cut at the cut intended position AA, the state of the trailing edge of the index tag image IX contained in the original image IM can be reproduced correctly.

In the illustrated example of FIG. 7C, the length L1 of the additional image AI is set to a length corresponding to 1 pixel. First, paper P having a length greater than that of the original image IM is selected (#100 of FIG. 8). Then, the region selection portion 20ha selects and copies an additional image AI which has a predetermined length L1 corresponding to the entire width of the original image IM and extends from the trailing edge of the original image IM toward the leading edge thereof, i.e., inwardly (#102 of FIG. 8). The additional image AI thus copied is temporarily stored in a storage medium such as, for example, the RAM 20B or the hard disk 20d.

Thereafter, the additional image AI is added outwardly from the trailing edge of the original image IM (right-hand side of FIG. 7C) as shown in the region R1, and the entire image after the addition is deemed as an intermediate image (#104 of FIG. 8). Then, A) it is determined whether or not the trailing edge of the intermediate image is beyond the cut intended position AA (#106 of FIG. 8). If B) the trailing edge of the intermediate image is not beyond the cut intended position AA (No in #106 of FIG. 8), then the additional image AI is further added outwardly from the trailing edge of the intermediate image as shown in the region R2, and the entire image after the further addition is deemed as a new intermediate image, so that the intermediate image before the further addition is replaced with the new intermediate image. Then, the determination A) as mentioned above is made. If the result of the determination A) shows that the trailing edge of the new intermediate image is not beyond the cut intended position AA, the same operation as B) described above and the determination A) are performed repeatedly as shown in the regions R3-R8. For example, if the additional image AI is added to the region R8, and the result of the determination A) shows that the trailing edge of the intermediate image is beyond the cut intended position AA (Yes in #106 of FIG. 8), then that intermediate image is deemed as a post-correction image (#110 of FIG. 8), and a printing process described later is performed. The image correction portion 20hb performs the addition of the additional image AI and the determination.

The image processing discussed above with reference to FIG. 7C is an example in which addition of the additional image AI is repeatedly performed until the trailing edge of the intermediate image is beyond the cut intended position AA. Another configuration is possible in which the image processing portion 20h calculates, in advance, the length from the trailing edge of the original image IM across the cut intended position AA, enlarges the additional image AI outwardly so as to have the calculated length, and performs the process by adding the additional image AI only one time.

The following is a description of a method for the terminal 4 to make the image processing settings described above. Suppose that, for example, a storage device of the terminal 4 stores, therein, a file made up of a plurality of pages containing an index tag image IX. Any file format is possible as long as the terminal 4 and the MFP 2 can perform processing on the file.

In the case of making print settings with the terminal 4, if a file to be printed is specified, then a print settings screen (not shown) for a print driver is displayed on the terminal 4. Further, if the MFP 2 is set as a print destination, then a print settings screen (not shown) for the MFP 2 is displayed. If the print settings screen for the MFP 2 is provided with, for example, a click button to select "borderless printing of index tag" (not shown), and the button is clicked, then an index tag borderless printing settings screen 200 shown in FIG. 9 is displayed on the terminal 4.

Figure 9:
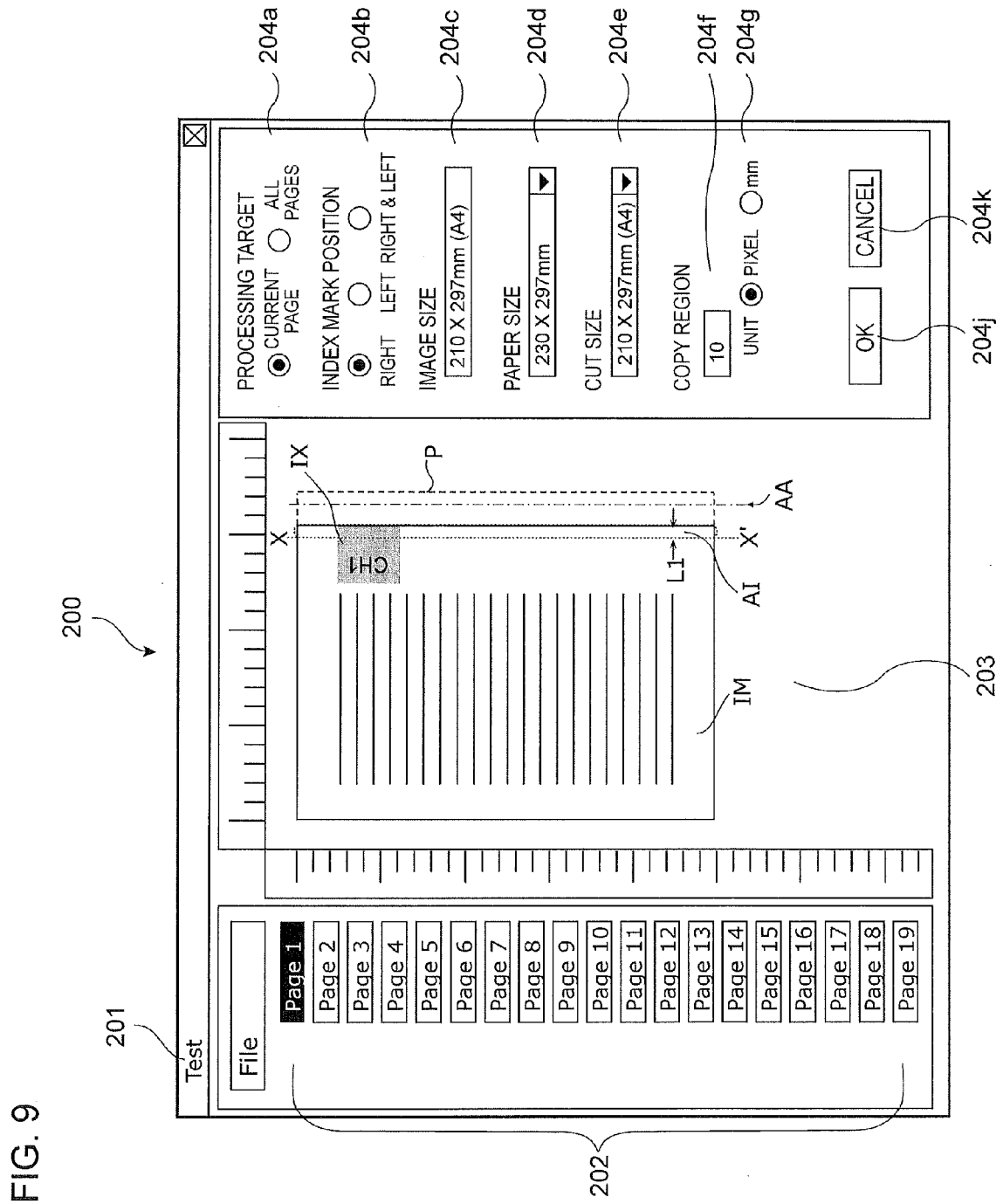
FIG. 9 is a diagram illustrating an example of an index tag borderless printing settings screen in the first embodiment.

Referring to the index tag borderless printing settings screen 200 of FIG. 9, reference numeral 201 denotes a name display portion of a selected file, and the name of a selected file is displayed therein. A plurality of page buttons denoted by reference numeral 202 indicate page numbers of the individual pages contained in the file. If a page button 202 of a page to be selected is clicked, then a page of the file corresponding to the page number is selected (highlighted), and the original image IM representing image data of the selected page, and so on are displayed on the page display portion 203. In this example, the original image IM with the index tag image IX is displayed therein.

A processing target selection portion 204a is displayed in the form of radio button on the right-hand side of FIG. 9. The processing target selection portion 204a is used to select an application target of setting details on the index tag borderless printing settings screen 200 currently displayed. For example, the processing target selection portion 204a is used to select whether the current setting details are applied only to a page selected by the page button 202 or to all the pages of the file. An index tag position specifying portion 204b in the form of radio button is used to specify whether the index tag image IX is provided on the "right" side, the "left" side, or "both" sides of the screen. The "right" side to be used frequently may be set as a default. In the first embodiment, the "right" side is specified. Another configuration is possible in which the position of the index tag image IX is automatically recognized as image, and the recognition result is reflected as default settings in the index tag position specifying portion 204b.

The size of the original image IM of the page selected by clicking the page button 202 is displayed in an image size displaying portion 204c. A paper size selection portion 204d in the form of pull-down menu is used to select paper P larger than the original image. Another configuration is possible in which paper P slightly longer than the original image IM is automatically selected. After the selection of the paper size, the original image IM and the paper P are displayed on the page display portion 203 in such a manner that the ends of the original image IM and the paper P are aligned with each other. A cut size selection portion 204e in the form of pull-down menu indicates a size of the paper P after cutting the same, and selection can be made from among the predetermined sizes. Alternatively, it is possible to set any size in the cut size selection portion 204e. For example, the same size as the image size is selected as a default. After the cut size is selected, the cut intended position AA may be displayed on the screen. Note that the practical image processing is performed through steps described with reference to FIGS. 7A-8.

A copy region size input portion 204f is used to enter a length L1 (a width in the horizontal direction of the drawing) of an additional image AI to be added to the trailing edge of the original image IM in such a manner that the additional images AI are adjacent to each other in order. A unit selection portion 204g in the form of radio button is used to specify a unit of a numeric value entered in the copy region size input portion 204f. In this embodiment, "pixel" and "millimeter" are provided as examples of the unit, and either "pixel" or "millimeter" can be specified. Another configuration is possible in which a default numeric value and a default unit are preset respectively in the copy region size input portion 204f and the unit selection portion 204g. Yet another configuration is possible in which the length L1 of the additional image AI is fixed based on a preset numeric value and a preset unit without providing the copy region size input portion 204f and the unit selection portion 204g.

When a numeric value is entered into the copy region size input portion 204f and a unit is determined in the unit selection portion 204g, the X-X' line displayed in the original image IM on the page display portion 203 moves along the horizontal direction of the drawing, and the length L1 of the additional image AI changes depending on the value entered in the copy region size input portion 204f. This is convenient for a user to determine the length L1 of the additional image AI in accordance with the size, shape, design, pattern type, and description of the index tag image IX. The user clicks a cancel button 204k in order to cancel the settings mentioned above, or clicks an OK button 204j in order to enable all the settings.

If the OK button 204j is clicked, the terminal 4 transmits, as a print job, the original image IM and the setting details of each page contained in the file to the MFP 2 via the network 3. In response to the print job received, the MFP 2 performs the image processing discussed earlier with referenced to FIGS. 7A-8 for each of the setting details of the pages contained in the file or based on the identical setting details of the pages collectively. Thereafter, the paper supplying/conveying portion 2c supplies and conveys paper P in such a manner that a predetermined positional relationship is established between the paper P having the set size and a post-correction image, or, in other words, the leading edges of the paper P and the post-correction image are aligned with each other. After that, the post-correction image is printed onto the paper P. The trimming device 2i is used to cut the paper P along the trim position. In this way, borderless printing of the post-correction image containing the index tag image IX can be performed, and the index tag image IX can be seen at the fore edge of a bound book. Further, even when printed matters are accumulated on the paper output tray 2g, the index tag image IX can be seen at the edges thereof.

[Second Embodiment]

Figure 10A:
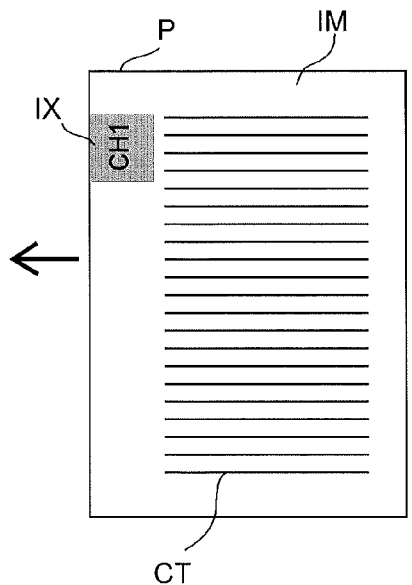
FIGS. 10A and 10B are diagrams illustrating an example of printing an index tag image.
Figure 10B:
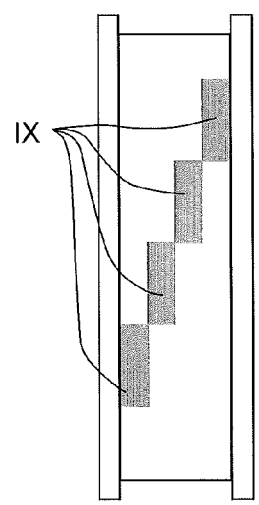

The second embodiment is directed to a so-called right binding in which, at the time of binding single-sided printed matters, the index tag images IX are provided at the leading edge of the paper in the paper feed direction, i.e., the left-hand side of the drawing. FIG. 10A shows a state where the original image IM is printed onto paper P having the same size as that of the original image IM. FIG. 10B shows the fore edge of a book for a case where a plurality of sheets of paper having the original image IM printed are bound up. FIGS. 10A and 10B show the state of paper P having no image unformed regions, i.e., which has been obtained with so-called borderless printing. The arrow of FIG. 10A represents the feed direction of the paper P by the MFP 2.

As described above, if the original image IM can be printed onto the paper P with borderless printing, the index tag images IX can be viewed on the fore edge of a book as shown in FIG. 10B, and also, the index tag images IX of printed matters or copied matters accumulated on the paper output tray 2g can be viewed easily.

Figure 11A:
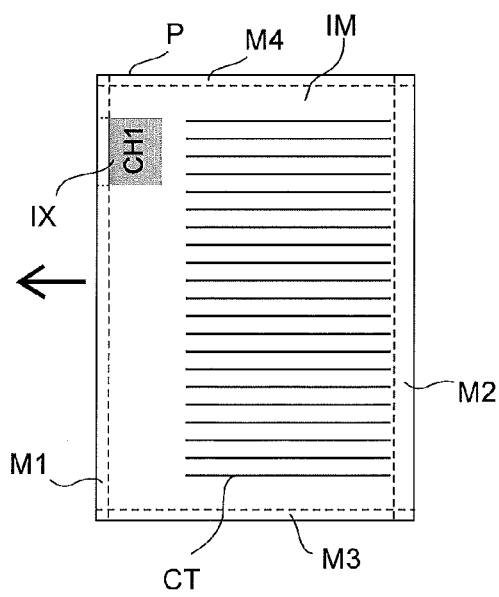
FIGS. 11A and 11B are diagrams illustrating an example in which an index tag image is lacking in an image unformed region.
Figure 11B:
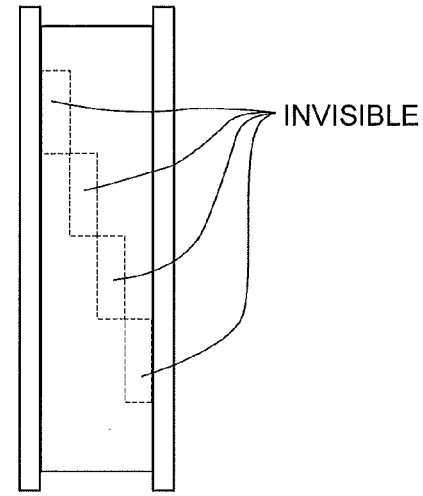

In ordinary image forming apparatuses, however, it is difficult to eliminate image unformed regions as discussed in the first embodiment. FIG. 11A shows image unformed regions M1-M4, and FIG. 11B shows an influence of the image unformed region M2 inflicted on the view of the index tag images IX.

In ordinary image forming apparatuses, when the original image IM as shown in FIG. 10A is printed onto paper P, a printed matter is outputted in such a manner that the left end of an index tag image IX is lost due to the presence of the image unformed region M1. As a result, the index tag images IX become invisible from the side of the fore edge of a book as shown in FIG. 11B.

Figure 12A:
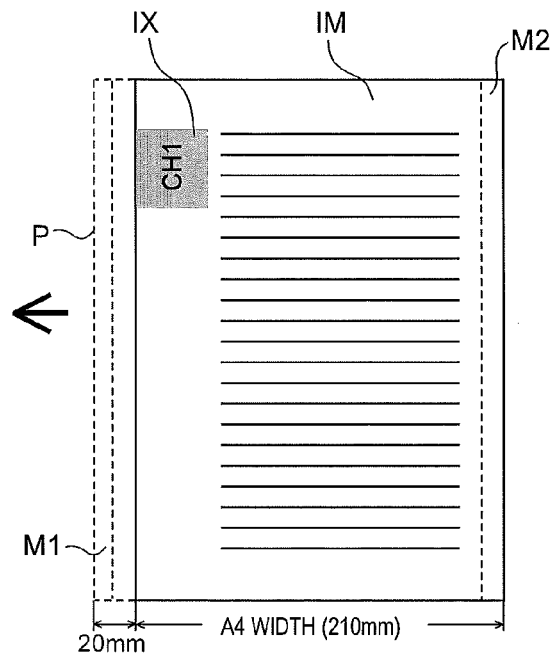
FIGS. 12A and 12B are diagrams illustrating the positional relationship between a cut position of paper and an index tag image.
Figure 12B:
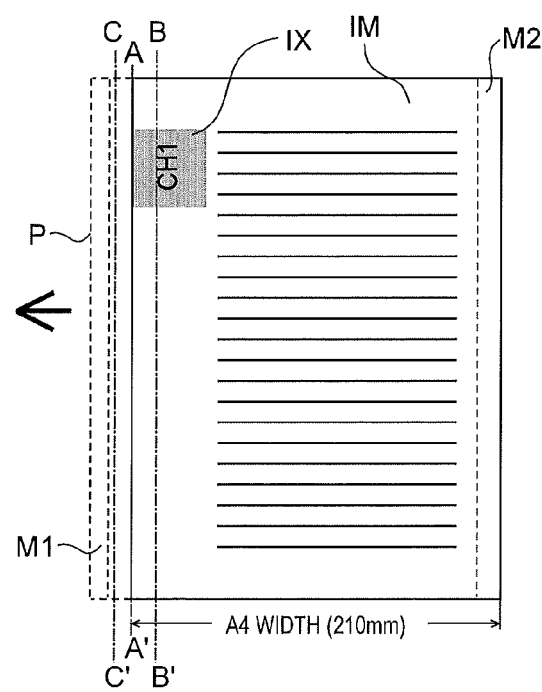

FIGS. 12A and 12B are diagrams illustrating a method for preventing the index tag image IX from being partially lost due to the image unformed region M1. FIG. 12A shows the positional relationship between paper P to be used and the index tag image IX, and FIG. 12B shows an influence of an error occurring at the time of cutting the paper P.

Referring to FIG. 12A, in the case where, for example, the original image IM is an A4 size (210×297 mm) image, paper P having a length in the paper feed direction greater than that of the original image IM, e.g., having a size of 230×297 mm, is used to print the original image IM. In such a case, paper supply or the like is so controlled that the paper P and a post-correction image, described later, establish a predetermined positional relationship in the paper feed direction. In the illustrated example of FIG. 12A, as viewed from the paper feed direction, the original image IM is printed out with the trailing edge of the paper P aligned with the trailing edge of the post-correction image.

This prevents the index tag image IX from extending over the image unformed region M1 as shown in FIG. 12B, and the entire index tag image IX is printed onto the paper P. Thereafter, the paper P onto which the index tag image IX has been printed is conveyed to the trimming device 2i. The trimming device 2i cuts the leading edge of the paper P at a cut position of the paper P denoted by the A-A' line so that the paper P has a predetermined length, i.e., 210 mm, from the trailing edge thereof to the cut position in the paper feed direction. In some cases, however, the paper P is not cut properly along the predetermined A-A' line due to the errors occurring at the time of cutting the paper P as discussed earlier. If the paper P is cut at the position along the line B-B' or the line C-C', then the problems discussed in the first embodiment sometimes arise.

Figure 13A:
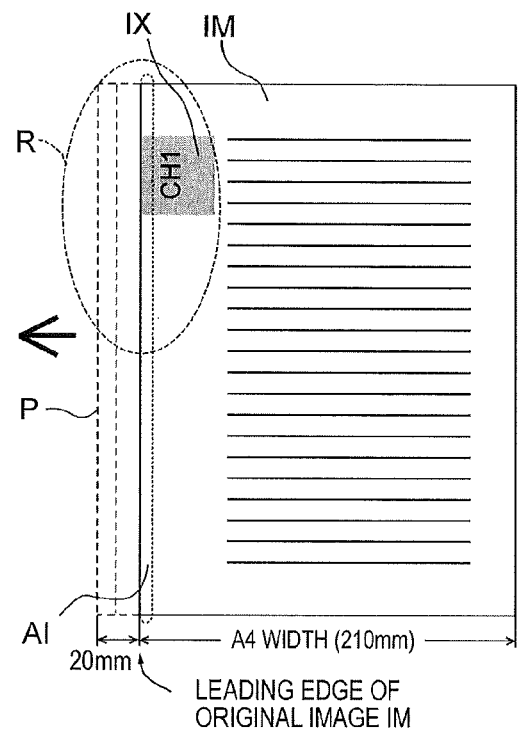
FIGS. 13A and 13B are diagrams illustrating a process on an index tag image in the second embodiment.
Figure 13B:
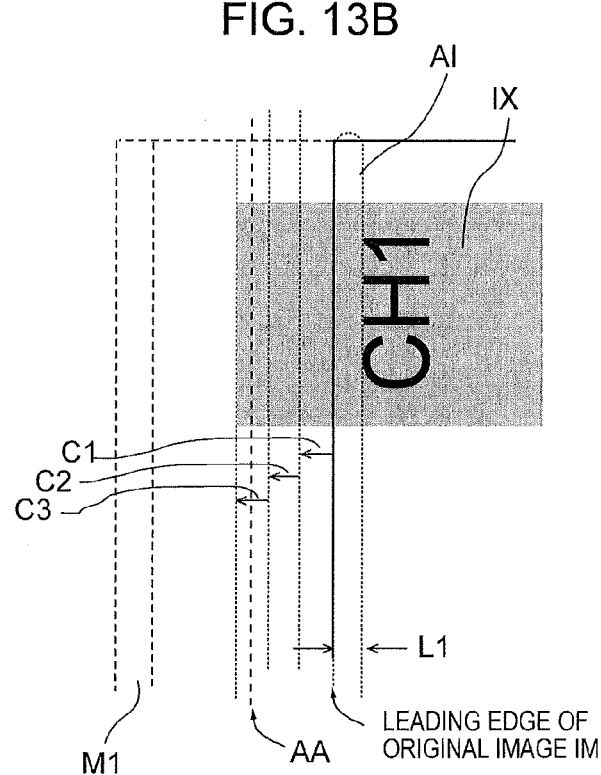
Figure 14:
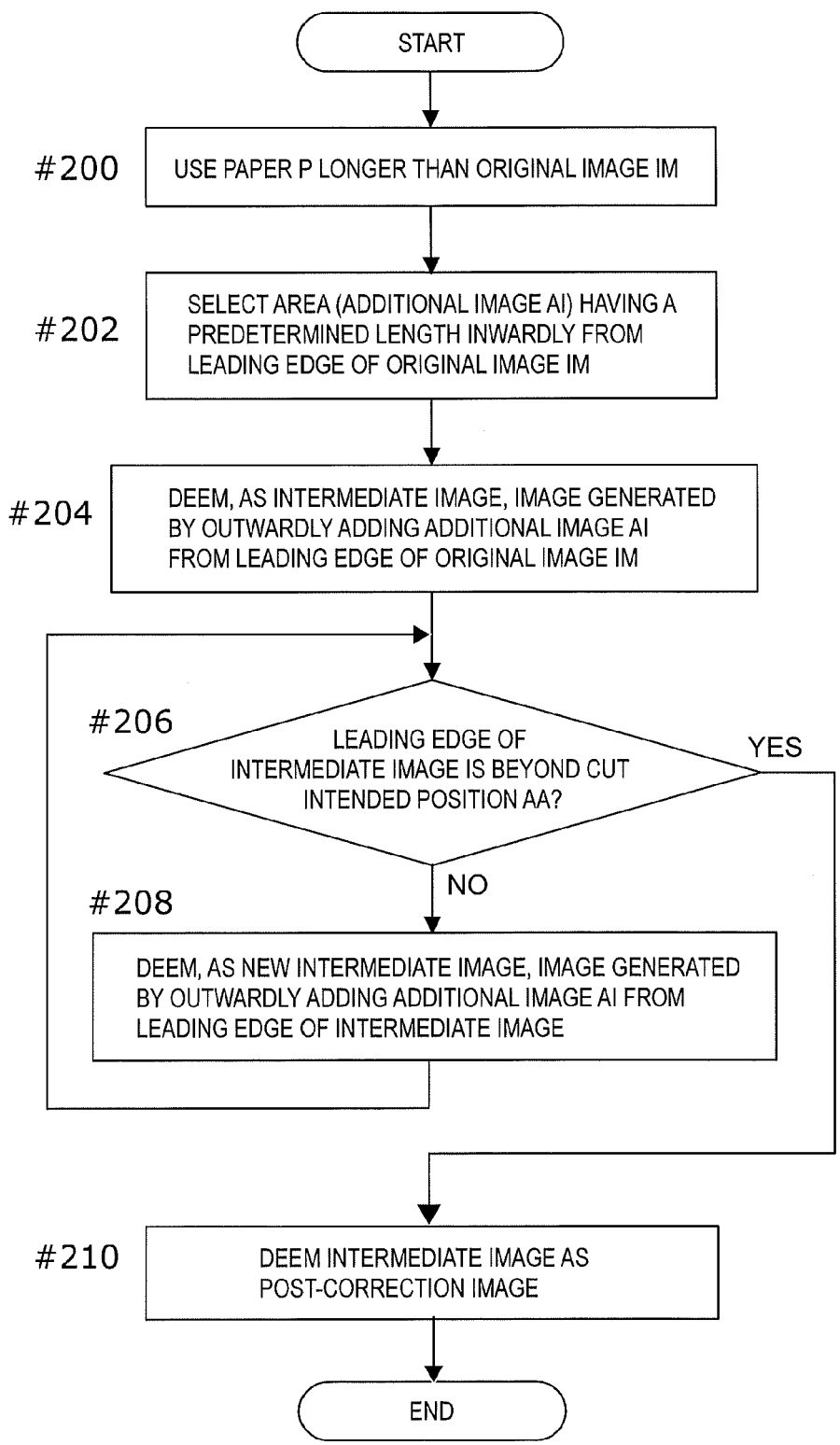
FIG. 14 is a flowchart depicting an example of a process on an index tag image in the second embodiment.

In order to avoid these states, the following processing is performed in the second embodiment. FIG. 13A shows image processing, and FIG. 13B shows the relationship between an error occurring at the time of cutting the paper P and the index tag image IX. FIG. 14 is a flowchart depicting the image processing. Note that the description in the second embodiment is simplified because the basic concept of the image processing according to the second embodiment is the same as that of the first embodiment although the positional relationship of the image, the paper P, and the like in the second embodiment is opposite to that in the first embodiment.

First, as shown in FIG. 13A, paper P is used which has a length in the paper feed direction greater than that of the original image IM (#200 of FIG. 14). As with the first embodiment, the size of each of the original image IM and the paper P in the paper feed direction is sometimes referred to as a "length", and the size of each thereof in the direction perpendicular to the paper feed direction is sometimes referred to as a "width" in the second embodiment.

Then, as shown in FIG. 13B, an additional image AI which has a predetermined length L1 corresponding to the entire width of the original image IM and extends from the leading edge of the original image IM toward the trailing edge thereof, i.e., inwardly, is selected and copied (#202 of FIG. 14). It is possible to change manually the predetermined length L1. In short, it is possible to arrange the predetermined length L1 in such a manner that the predetermined length L1 is variable based on the index tag image IX. The additional image AI is temporarily stored in a storage medium such as, for example, the RAM 20b or the hard disk 20d.

As shown in the arrows C1-C3 of FIG. 13B, the additional image AI thus stored is repeatedly added to the original image IM in order from the leading edge thereof outwardly in such a manner that the additional images AI are adjacent to each other. The options same as those of the first embodiment are provided as to how many times the additional image AI is to be added repeatedly and what kind of method is to be used for the addition. Among the options, steps of image processing are described below by taking an example of a method in which the additional image AI is repeatedly added until the leading edge of an intermediate image is beyond a cut intended position AA.

The stored additional image AI is added outwardly from the leading edge of the original image IM as shown by the arrow C1, and the image after the additional image AI has been added is deemed as an intermediate image (#204 of FIG. 14). Then, A) it is determined whether or not the leading edge of the intermediate image is beyond the predetermined cut intended position AA of the paper P (#206 of FIG. 14). If B) the leading edge of the intermediate image is not beyond the cut intended position AA (No in #206 of FIG. 14), then the additional image AI is further added outwardly from the leading edge of the intermediate image as shown by the arrow C2, and the image after the further addition is deemed as a new intermediate image, so that the intermediate image before the further addition is replaced with the new intermediate image. Then, the determination A) as mentioned above is made. If the result of the determination A) shows that the leading edge of the intermediate image is not beyond the cut intended position AA, the same operation as B) described above and the determination A) are performed repeatedly as shown by the arrow C3. For example, if the determination A) as mentioned above is made, and if the result of the determination A) shows that the leading edge of the intermediate image is beyond the cut intended position AA (Yes in #206 of FIG. 14), then that intermediate image is deemed as a post-correction image (#210 of FIG. 14), and a printing process described later is performed.

Settings of the cut intended position AA in the second embodiment are the same as those of the first embodiment. The trailing edge of the post-correction image generated as described above is aligned with the trailing edge of the paper P, and while they remain in this state, printing is performed. The paper P onto which an image has been printed is cut at the trim position, and thereby the index tag images IX become visible on the fore edge of a book at the time of binding. Likewise, as for copied matters accumulated on the paper output tray 2g of the MFP 2, the index tag images IX become visible on the ends of the copied matters.

Figure 15:
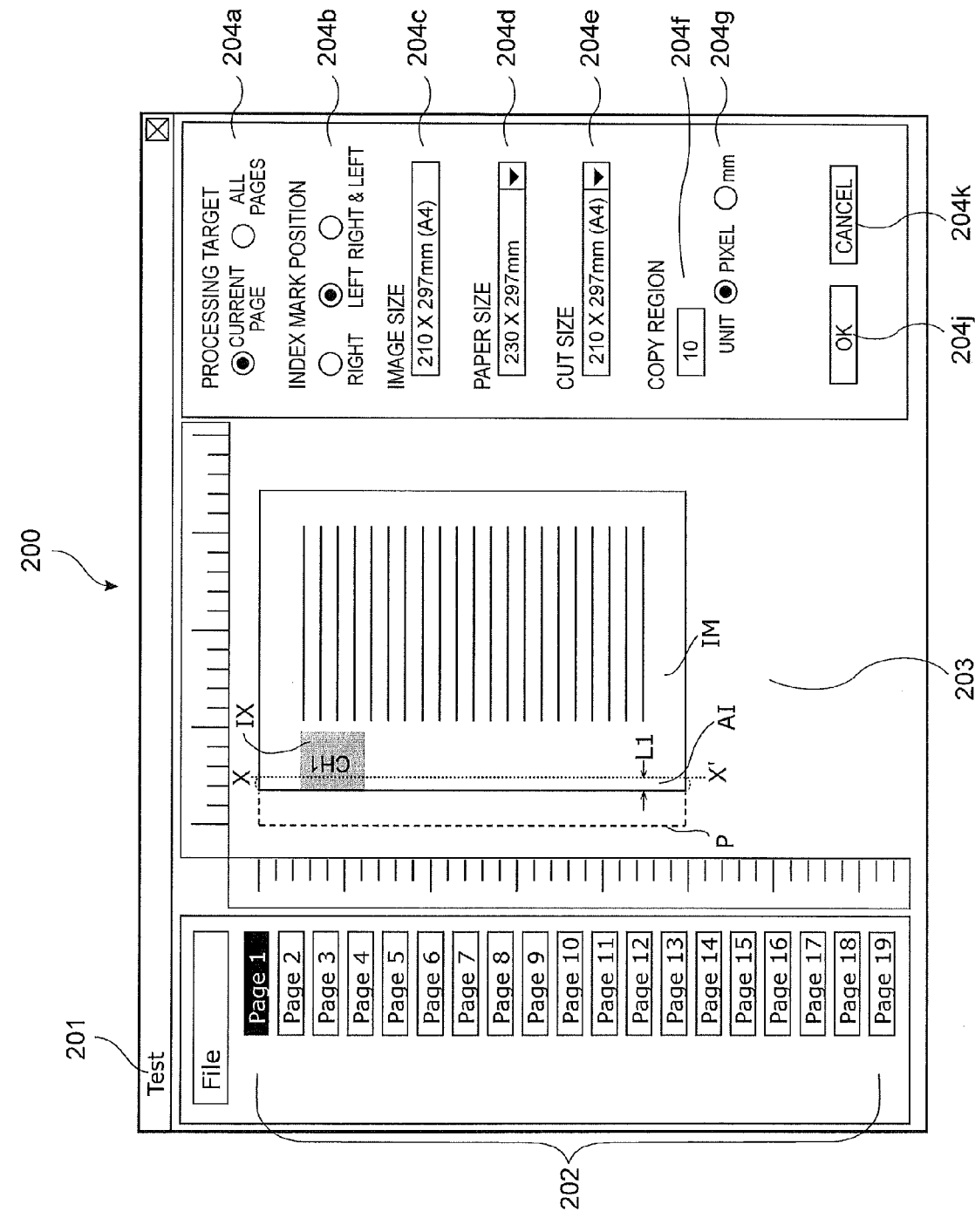
FIG. 15 is a diagram illustrating an example of an index tag borderless printing settings screen in the second embodiment.

The following is a description of a method for the terminal 4 to make the processing settings described above. The index tag borderless printing settings screen 200 of FIG. 15 differs from the index tag borderless printing settings screen 200 of FIG. 9 primarily in a display state of the original image IM overlaid on the paper P displayed in a page display portion 203, and designation of the "left" side selected in an index tag position specifying portion 204b. The other things are common to the index tag borderless printing settings screen 200 of FIG. 15 and the index tag borderless printing settings screen 200 of FIG. 9. Accordingly, only the different parts will be described below.

In the second embodiment, an index tag position specifying portion 204b is used to designate the "left" side of the screen as the position of the index tag image IX. A paper size selection portion 204d is used to select paper P larger than the original image IM. Another configuration is possible in which paper P slightly larger than the original image IM is automatically selected. A cut size selection portion 204e is used to select the size of the paper P after cutting the paper P. After the paper size is selected, the original image IM and the paper P are displayed in the page display portion 203 with the trailing edge of the original image IM aligned with the trailing edge of the paper P.

A copy region size input portion 204f and a unit selection portion 204g are used to specify a numeric value of the length L1 of an additional image AI in the horizontal direction of the drawing and a unit thereof, respectively. While viewing the screen, a user confirms the length L1 of the additional image AI, and changes the length L1 if necessary. Another configuration is possible in which a default numeric value and a default unit are preset respectively in the copy region size input portion 204f and the unit selection portion 204g. Yet another configuration is possible in which the length L1 of the additional image AI is fixed based on a preset numeric value and a preset unit without providing the copy region size input portion 204f and the unit selection portion 204g.

Then, the following is displayed eventually in the page display portion 203: the original image IM having the index tag image IX provided on the left-hand side thereof (the leading edge of the original image IM in the paper feed direction); the selected large paper P; and the region indicating the length L1 of the additional image AI (the width in the horizontal direction in the drawing). The user clicks a cancel button 204k in order to cancel the settings mentioned above, or clicks an OK button 204j in order to enable all the settings.

If the OK button 204j is clicked, then the terminal 4 transmits, as a print job, the original image IM and the setting details of each page contained in the file to the MFP 2 via the network 3. The subsequent processing to be performed by the MFP 2 is the same as that of the first embodiment. In this way, borderless printing of a post-correction image having the index tag image IX provided on the leading edge of the paper in the paper feed direction can be performed, and the index tag image IX can be seen at the fore edge of a book for the case of right-binding of the printed matters. Further, even when printed matters are accumulated on the paper output tray 2g, the index tag image IX can be seen at the edges thereof.

[Third Embodiment]

Figure 16A:
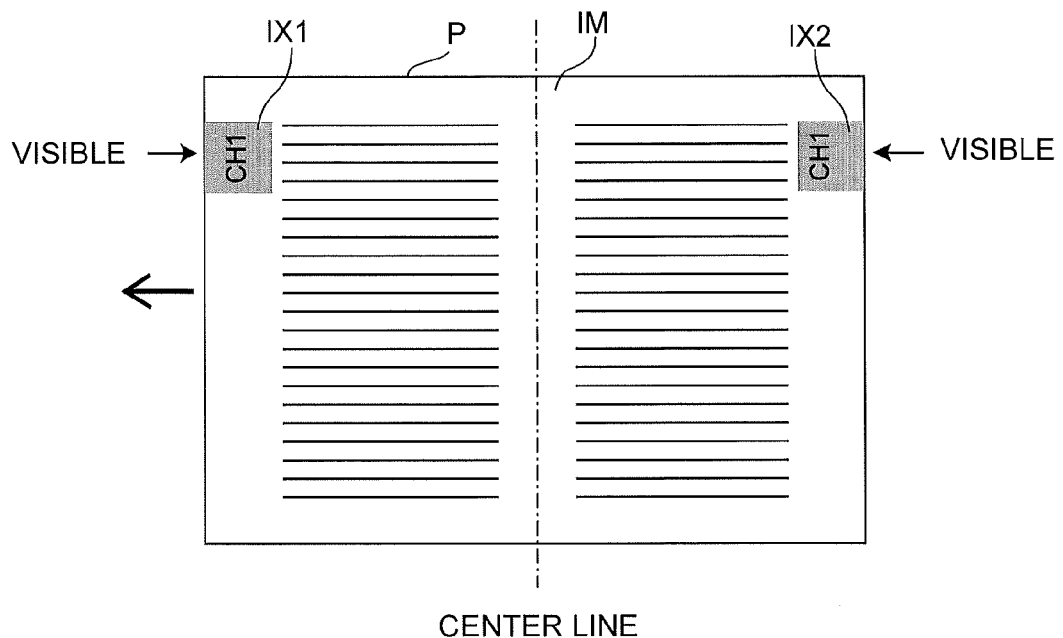
FIG. 16A is a diagram illustrating an example of printing an index tag image.

In the first embodiment, the case is described in which an index tag image IX is provided on the trailing edge of an original image IM. In the second embodiment, the case is described in which an index tag image IX is provided on the leading edge of an original image IM. Referring to FIG. 16A showing double-page spread, as viewed in the paper feed direction of the paper P, one half of the double-page is provided on a half corresponding to the leading edge of the double-page with respect to the center line, and the other half is provided on a half corresponding to the trailing edge thereof. The original image IM has an index tag image IX1 on the leading edge of the leading edge side page, and an index tag image IX2 on the trailing edge of the trailing edge side page. In such a case, if there are no image unformed regions M1 and M2 on the leading edge and the trailing edge of the paper P, both the index tag images IX1 and IX2 can be seen at the edges of the double-page.

Figure 16B:
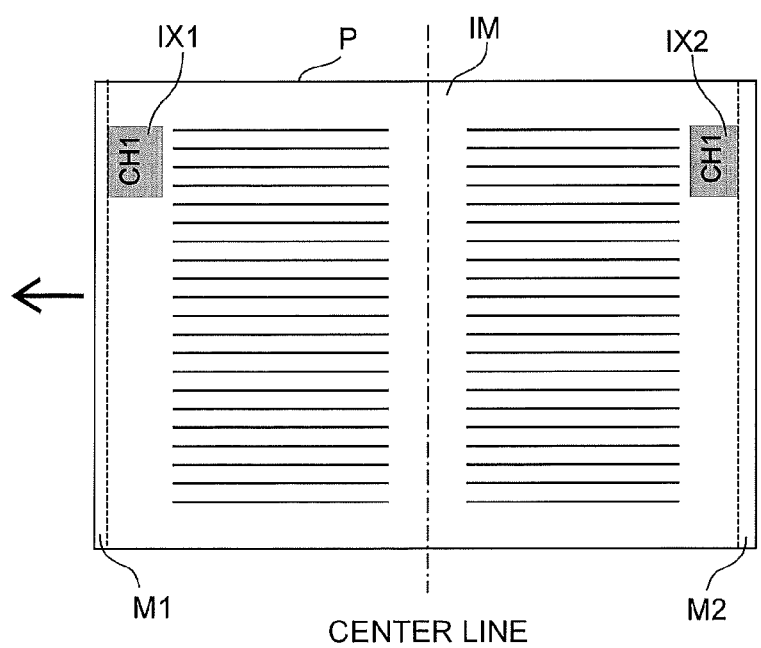
FIG. 16B is a diagram illustrating an example in which an index tag image is lacking in an image unformed region.

In general, however, image unformed regions M1 and M2 are generated on the leading edge and the trailing edge of the paper P respectively as shown in FIG. 16B. In such a case, the leading edge of the index tag image IM1 in the paper feed direction is lost because of the image unformed region M1, and the trailing edge of the index tag image IM2 in the paper feed direction is lost because of the image unformed region M2. How much the index tag images IX1 and IX2 are lost depends on the individual dimensions of the image unformed regions M1 and M2, respectively.

In order to avoid these states, the following processing is performed in the third embodiment. In the third embodiment, processing to be performed on the trailing edge of the original image IM is substantially the same as that of the first embodiment, and processing to be performed on the leading edge of the original image IM is substantially the same as that of the second embodiment; therefore a description of points common to those in the first and second embodiments are omitted.

Figure 17A:
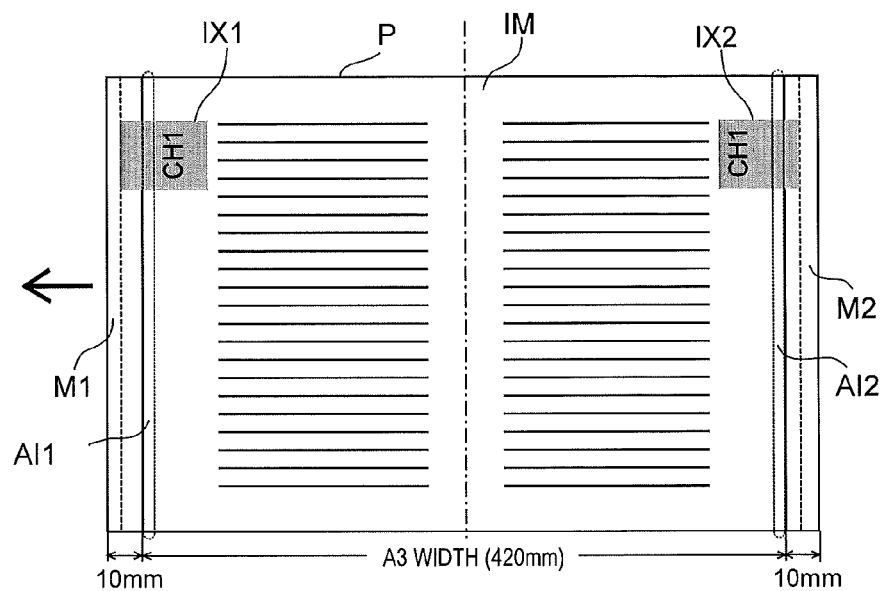
FIGS. 17A and 17B are diagrams illustrating a process on an index tag image in the third embodiment.
Figure 17B:
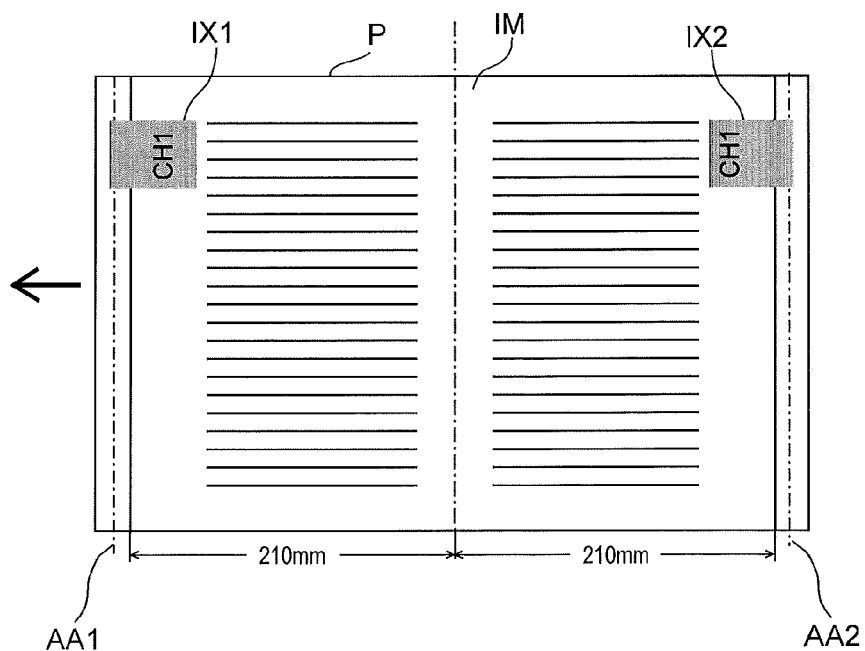
Figure 18:
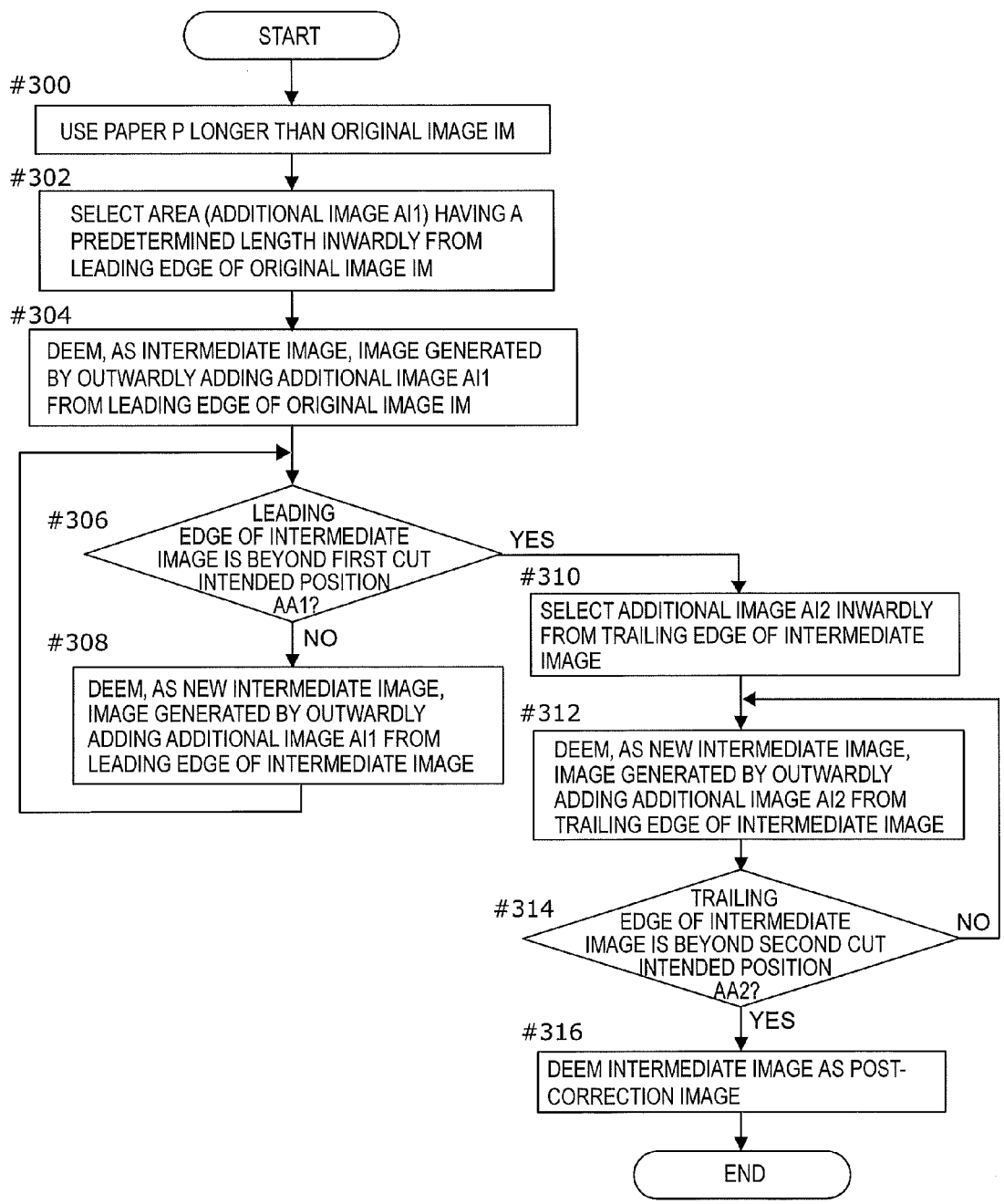
FIG. 18 is a flowchart depicting an example of a process on an index tag image in the third embodiment.

FIGS. 17A and 17B are diagrams showing the positional relationship between paper P and the original image IM, and image processing. FIG. 18 is a flowchart depicting steps of the image processing.

As shown in FIGS. 17A and 17B, paper P is used which has a length in the paper feed direction greater than that of the original image IM (#300 of FIG. 18). In the case where the original image IM is an A3 size (420×297 mm) image, paper P having a size of, for example, 440×297 mm is used. In such a case, upon printing, paper supply and paper feed are so controlled that the paper P and the original image IM establish a predetermined positional relationship in the paper feed direction. In the third embodiment, the center of the paper P in the paper feed direction is aligned with the center of the original image IM as described later. Note that, in the third embodiment, the size of the original image IM in the paper feed direction is referred to as a "length", and the size thereof in the direction perpendicular to the paper feed direction is referred to as a "width".

Then, an additional image AI1 which has a predetermined length L1 corresponding to the entire width of the original image IM and extends from the leading edge of the original image IM toward the trailing edge thereof, i.e., inwardly, is selected and copied (#302). The additional image AI1 is temporarily stored in a storage medium described in the first embodiment. The additional image AI1 thus stored is repeatedly added to the original image IM in order from the leading edge thereof outwardly in such a manner that the additional images AI1 are adjacent to each other. The options same as those of the first embodiment are provided as to how many times the additional image AI1 is to be added repeatedly and what kind of method is to be used for the addition. Among the options, steps of image processing are described below by taking an example of a method in which the additional image AI1 is repeatedly added until the leading edge of an intermediate image is beyond a first cut intended position AA1.

The stored additional image AI1 is added outwardly from the leading edge of the original image IM, and the image after the additional image AI1 has been added is deemed as an intermediate image (#304). Thereafter, the additional image AI1 is repeatedly added until the leading edge of the intermediate image is beyond the predefined first cut intended position AA1 provided in the leading edge of the paper P (No in #306, and #308).

If it is determined that the leading edge of the intermediate image is beyond the first cut intended position AA1 (Yes in #306 of FIG. 18), then an additional image AI2 which has a predetermined length L1 corresponding to the entire width of the original image IM and extends from the trailing edge of the original image IM toward the leading edge thereof, i.e., inwardly, is selected and copied (#310). The additional image AI2 is temporarily stored in the storage medium. The additional image AI2 thus stored is repeatedly added to the intermediate image in order from the trailing edge of the intermediate image outwardly in such a manner that the additional images AI2 are adjacent to each other. The options same as those of the first embodiment are provided as to how many times the additional image AI2 is to be added repeatedly and what kind of method is to be used for the addition. Among the options, steps of image processing are described below by taking an example of a method in which, for processing to be performed on the trailing edge of the intermediate image, the additional image AI2 is repeatedly added until the trailing edge of the intermediate image is beyond a second cut intended position AA2.

The stored additional image AI2 is added outwardly from the trailing edge of the intermediate image, and the intermediate image after the additional image AI2 has been added is deemed as a new intermediate image (#312). Thereafter, the additional image AI2 is repeatedly added until the trailing edge of the intermediate image is beyond the predefined second cut intended position AA2 provided in the trailing edge of the paper P (No in #306, and #308). Note that the second cut intended position AA2 of the paper P can be determined in a manner similar to the examples described in the first and second embodiments. If it is determined that the trailing edge of the intermediate image is beyond the second cut intended position AA2 (Yes in #314 of FIG. 18), then print processing described later is performed with the intermediate image subjected to the image processing mentioned above deemed as a post-correction image.

The post-correction image thus generated is conveyed with the center of the original image aligned with the center of the paper P, and printing of the post-correction image is performed. Then, the paper P onto which an image has been printed is cut at the first cut intended position AA1 and the second cut intended position AA2. Thereby, at the time of binding, the index tag images IX1 and IX2 become visible on the both sides of the double-page as shown in FIG. 16A. Likewise, as for copied matters accumulated on the paper output tray 2g of the MFP 2, the index tag images IX1 and IX2 become visible on the ends of the copied matters.

Figure 19:
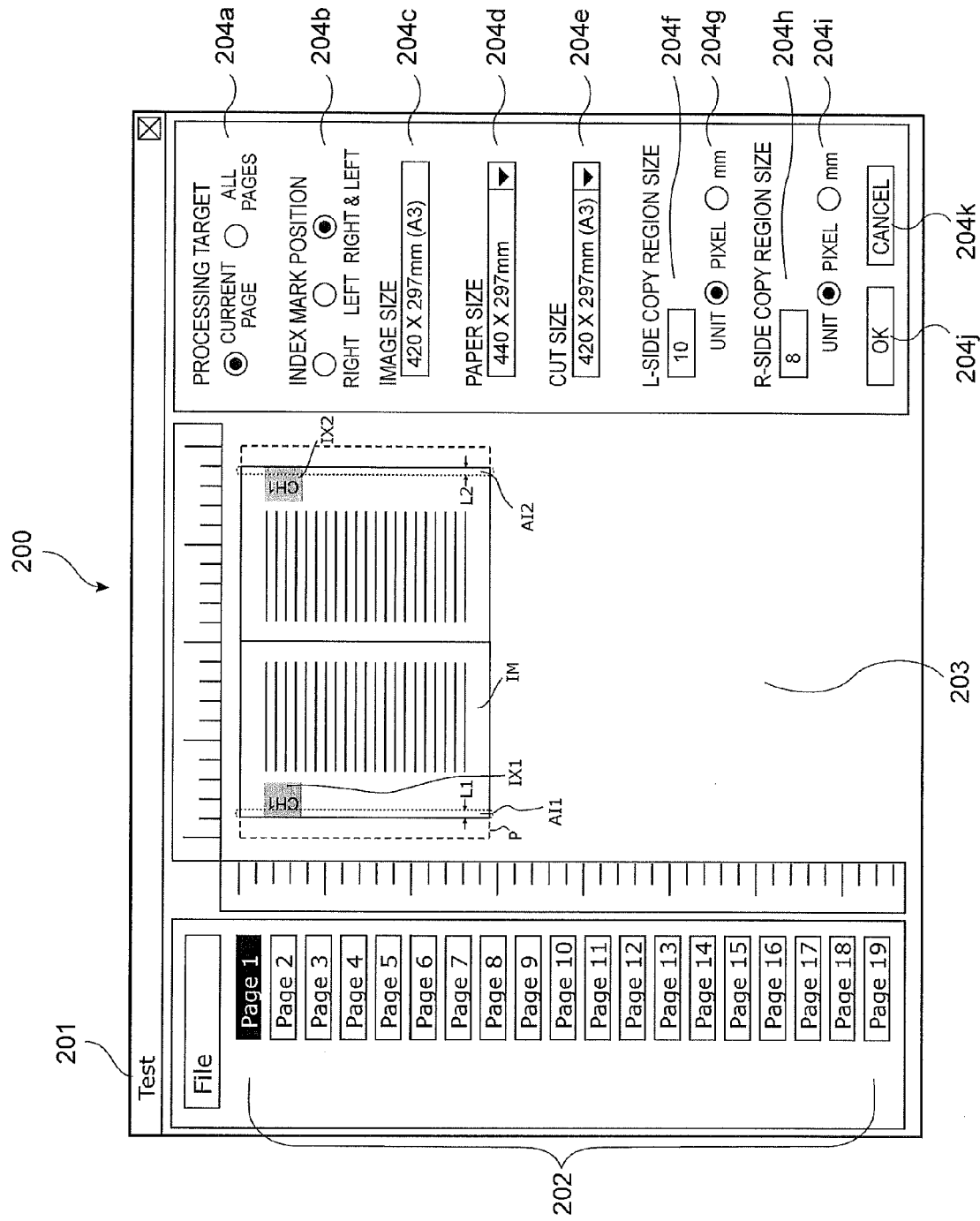
FIG. 19 is a diagram illustrating an example of an index tag borderless printing settings screen in the third embodiment.

The following is a description of a method for the terminal 4 to make the image processing settings described above. The index tag borderless printing settings screen 200 of FIG. 19 differs from the index tag borderless printing settings screens 200 of FIGS. 9 and 15 primarily in a display state of the original image IM overlaid on the paper P displayed in a page display portion 203, designation of the "right and left" sides selected in an index tag position specifying portion 204b, and in that a copy region size input portion and a unit selection portion are provided for each of the index tag image IX1 on the leading edge of the original image IM and the index tag image IX2 on the trailing edge thereof.

In the third embodiment, an index tag position specifying portion 204b is used to designate the "right and left" sides of the screen as the position of the index tag image IX. A paper size selection portion 204d is used to select paper P larger than the original image IM. Another configuration is possible in which paper P slightly larger than the original image IM is automatically selected. A cut size selection portion 204e is used to select the size of the paper P after cutting the paper P.

A left side copy region size input portion 204f and a unit selection portion 204g are respectively used to specify a numeric value of the length L1 of an additional image AI1 on the left-hand side of the screen in the horizontal direction of the drawing and a unit thereof. A right side copy region size input portion 204h and a unit selection portion 204i are respectively used to specify a numeric value of the length L2 of an additional image AI2 on the right-hand side of the screen in the horizontal direction of the drawing and a unit thereof. While viewing the screen, a user confirms the additional image AI1 and the length L1 thereof, and the additional image AI2 and the length L2 thereof, and then, makes a change thereto if necessary. Another configuration is possible in which a default numeric value is preset in each of the left side copy region size input portion 204f and the right side copy region size input portion 204h, and a default unit is preset in each of the unit selection portion 204g and the unit selection portion 204i. Yet another configuration is possible in which the lengths L1 and L2 of the additional images AI1 and AI2 are fixed based on pre-set numeric values and pre-set units.

Then, the following is displayed eventually in the page display portion 203: the index tag image IX1 provided on the left-hand side of the screen (the leading edge of the original image IM in the paper feed direction); the index tag image IX2 provided on the right-hand side of the screen (the trailing edge of the original image IM in the paper feed direction), the selected large paper P, and the regions indicating the additional image AI1 and the additional image AI2 having the lengths L1 and L2 respectively. The user clicks a cancel button 204k in order to cancel the settings mentioned above, or clicks an OK button 204j in order to enable all the settings.

If the OK button 204j is clicked, then the terminal 4 transmits, as a print job, the original image IM and the setting details of each page contained in the file to the MFP 2 via the network 3. The subsequent processing to be performed by the MFP 2 is the same as those of the first embodiment and the second embodiment. In this way, borderless printing of the original image IM in which the index tag images IX1 and IX2 are provided respectively on the leading edge and trailing edge of the original image IM in the paper feed direction can be performed. The index tag images IX1 and IX2 can be viewed on the ends of accumulated printed matters. Further, even when printed matters are accumulated on the paper output tray 2g, the index tag images IX1 and IX2 can be seen on the ends thereof.

In the first through third embodiments, the following example is described: The terminal 4 is used to make settings for borderless printing, the setting details are transmitted as a print job to the MFP 2 together with a file to be printed or the original image IM, and the MFP 2 performs the sequence of processes for borderless printing. Instead, however, the borderless printing can be performed in the following manner. A settings screen similar to the index tag borderless printing settings screen 200 is displayed on the display portion 2e of the MFP 2. An original image based on image data that has been received from the terminal 4, or on image data that has been stored in the hard disk 20d of the MFP 2 as a result of scanning by the scanner unit 2b of the MFP 2 is read out on the settings screen of the operational panel 20f of the MFP 2. Then, settings are made in a manner similar to that in the terminal 4. The first through third embodiments are applicable to printing after scanning, by the scanner unit 2e of the MFP 2, a document containing therein an image with an index tag image, or, in other words, applicable to a copy job by the MFP 2.

The embodiments of the present invention are described above; however the present invention is not limited thereto, and the following configuration is possible. While the MFP 2 according to the embodiments contains the trimming device 2i therein, it is possible to use an MFP that does not contain the trimming device 2i therein. In such a case, a finisher with a trimming device is mounted onto the MFP. Then, the image processing described in the first through third embodiments is performed, and an image is printed onto large paper, and then, the paper is conveyed to the finisher for cutting. Alternatively, it is also possible to output and accumulate paper onto which an image has been printed without cutting the paper, and thereafter, a so-called offline trimming device is used to cut the paper.

Further, in the first through third embodiments, descriptions are provided by taking an example of the index tag image IX as a typical example of an index. However, the present invention is not limited to the exemplified shape of the index tag image IX as long as an index can be seen on the end of paper. For example, the first through third embodiments are applicable to a case in which pages to which gradation or color is entirely applied in the case of binding, or a case of index tag images having a linear shape viewed from the end of paper. Further, the first through third embodiments are also applicable to, for example, a case where borderless printing is necessary on the paper edges even if the processing on the index is not intended.

As discussed above, the present embodiments enable a user to use an ordinary image forming apparatus which inherently generates image unformed regions to perform borderless printing of an image having an index tag image. Further, even in the case of a complicated index tag image, printing can be performed in such a manner that only the background (pattern) part thereof extends over the edge of the paper.

The image forming apparatus may be general-purpose OA equipment supposed to be used in usual offices, like the MFP2, and may be an on-demand printer supposed to be used in companies oriented to a printing business or in-house POD.

The present invention makes it possible to provide an image forming apparatus useful for producing a printed matter whose print area on the paper surface extends to an edge of the paper, and a method for producing the printed matter.

The present invention also makes it possible to obtain a printed matter having a visible index tag on its edge without enlarging the entire original image.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus for printing an original image indicated based on image data, the image forming apparatus comprising:
   a paper feed portion that conveys, to a print position, paper having a size in a feed direction larger than a size of the original image;
   a region selection portion that selects, as an additional image, a band-shaped region that has a predetermined width and extends inwardly from an edge of the original image in a direction corresponding to the feed direction of the paper; and
   an image correction portion that adds the additional image repeatedly in such a manner that the additional image is placed adjacent to each other outwardly from the edge of the original image and the image correction portion adds the additional image repeatedly to the original image until an edge of the corrected image is beyond a cut intended position set outside the edge of the original image,
   wherein a corrected image obtained by adding the additional image with the image correction portion is printed onto the paper.

2. The image forming apparatus according to claim 1, wherein the original image contains, as image information, an index tag image extending to the edge of the original image.

3. The image forming apparatus according to claim 1, wherein the edge of the original image corresponds to a trailing edge of the paper in the feed direction.

4. The image forming apparatus according to claim 1, wherein the edge of the original image corresponds to a leading edge of the paper in the feed direction.

5. The image forming apparatus according to claim 1, wherein the width of the additional image is a width in units of pixels of the original image.

6. The image forming apparatus according to claim 1, wherein a length of the paper in the feed direction is equal to or greater than a total length of a length of the original image in the feed direction and a width of an image unformed region provided in an end of the paper in the feed direction.

7. The image forming apparatus according to claim 1, further comprising a trimming portion that cuts the paper on which the corrected image has been printed at a region where the corrected image has been printed.

8. A method for producing a printed matter on which an original image indicated based on image data is printed, the method comprising:
   selecting, by an image processing portion, as an additional image, a band-shaped region that has a predetermined width and extends inwardly from an edge of the original image in a direction corresponding to the feed direction of the paper;
   performing, by the image processing portion, image correction of adding the additional image repeatedly in such a manner that the additional image is placed adjacent to each other outwardly from the edge of the original image until an edge of the corrected image is beyond a cut intended position set outside the edge of the original image;
   printing, by an image forming apparatus for conveying paper to a print position to print an image onto the paper, a corrected image obtained as a result of the image correction onto paper having a size larger than a size of the original image in the feed direction; and
   cutting the paper on which the corrected image has been printed at a position corresponding to the cut intended position.

9. The method according to claim 8, wherein the original image contains, as image information, an index tag image extending to the edge of the original image.

10. The method according to claim 8, wherein the edge of the original image corresponds to a trailing edge of the paper in the feed direction.

11. The method according to claim 8, wherein the edge of the original image corresponds to a leading edge of the paper in the feed direction.

12. The method according to claim 8, wherein the width of the additional image is a width in units of pixels of the original image.

13. The method according to claim 8, wherein a length of the paper in the feed direction is equal to or greater than a total length of a length of the original image in the feed direction and a width of an image unformed region provided in an end of the paper in the feed direction.

14. The method according to claim 8, further comprising cutting the paper on which the corrected image has been printed at a region where the corrected image has been printed.

15. The method according to claim 8, wherein the original image contains, as image information, an index tag image extending to the edge of the original image.

* * * * *